United States Patent
Norimatsu

(10) Patent No.: US 6,697,537 B2
(45) Date of Patent: Feb. 24, 2004

(54) IMAGE PROCESSING METHOD AND APPARATUS

(75) Inventor: Masashi Norimatsu, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/141,930

(22) Filed: May 10, 2002

(65) Prior Publication Data

US 2002/0164085 A1 Nov. 7, 2002

Related U.S. Application Data

(62) Division of application No. 09/294,996, filed on Apr. 20, 1999.

(30) Foreign Application Priority Data

Apr. 20, 1998 (JP) ............................................ 10-125301
Jun. 11, 1998 (JP) ............................................ 10-163182

(51) Int. Cl.$^7$ ................................................ G06K 9/40
(52) U.S. Cl. ................... 382/275; 358/520; 358/521; 358/532; 382/167; 382/169; 382/263; 382/274
(58) Field of Search ............................... 382/263, 266, 382/274–275, 299, 167, 169; 358/3.27, 447, 463, 518, 517–521, 532

(56) References Cited

U.S. PATENT DOCUMENTS

| | | | | |
|---|---|---|---|---|
| 5,641,596 | A | * | 6/1997 | Gray et al. .................... 430/21 |
| 5,739,922 | A | * | 4/1998 | Matama ....................... 358/447 |
| 5,940,527 | A |   | 8/1999 | Takeo |
| 6,021,256 | A |   | 2/2000 | Ng et al. |
| 6,055,340 | A | * | 4/2000 | Nagao ......................... 382/261 |
| 6,091,861 | A | * | 7/2000 | Keyes et al. ................. 382/299 |
| 6,094,508 | A |   | 7/2000 | Acharya et al. |
| 6,192,152 | B1 |  | 2/2001 | Funada et al. |
| 6,208,763 | B1 |  | 3/2001 | Avinash |
| 6,229,578 | B1 |  | 5/2001 | Acharya et al. |
| 6,373,992 | B1 | * | 4/2002 | Nagao ......................... 382/266 |

FOREIGN PATENT DOCUMENTS

JP          63272173         11/1988

* cited by examiner

Primary Examiner—Bhavesh M. Mehta
Assistant Examiner—Gregory Desire
(74) Attorney, Agent, or Firm—Birch, Stewart, Kolasch & Birch, LLP

(57) ABSTRACT

The image processing method and apparatus calculate and store gradients representing directions and intensities of a pixel of interest and its surrounding pixels from pixel values of the pixel of interest and its surrounding pixels of image composed of the color image signals that are to be subjected to image processing, calculate connectivity of the pixel of interest with its surrounding pixels from the directions of the stored gradients, calculate directivities of respective R, G and B of the pixel of interest by calculating gradients of respective R, G and B channels of the pixel of interest and decide whether the pixel of interest is an edge portion or not from the calculated connectivity and directivities of respective R, G and B to extract the edge portion. As a result, the method and the apparatus can raise extraction precision of the edge portion, accurately perform the edge portion extraction and increase image quality. Moreover, the method and apparatus calculate correction amounts of degree of sharpness enhancement and granularities of a plurality of the specified regions formed by dividing the image data based on the extraction result of the edge portion and correct the image data based on these correction amounts. Accordingly, careful and minute corrections of granularity and degree of sharpness enhancement can be performed on the image recorded in one frame.

14 Claims, 19 Drawing Sheets

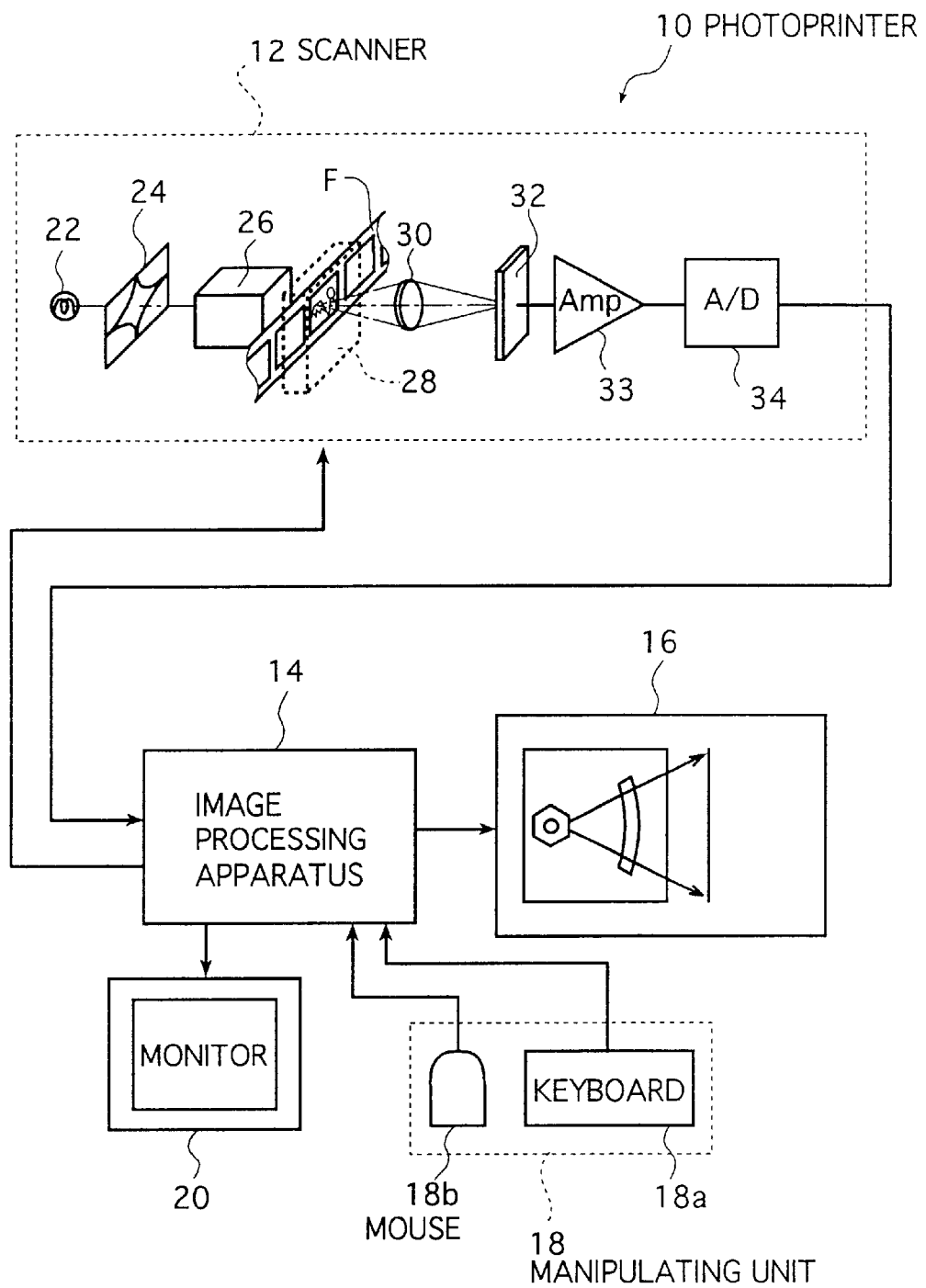

Step 1
```
CALCULATE DIRECTION AND
INTENSITY OF GRADIENT
```

Step 2
```
CHECK DIRECTIVITIES OF
ADJACENT PIXELS
```

Step 3
```
BOTH ADJACENT PIXELS
BEING WITHIN ALLOWABLE
LIMITATION(WITHIN 45°)
```

Step 4
```
CHECK DIRECTIVITIES OF
RESPECTIVE R,G AND B
```

Step 5
```
DECIDE AND EXTRACT
EDGE PORTION
```

FIG.10A1
| 1 | 2 | 1 |
|---|---|---|
| 0 | 0 | 0 |
| -1 | -2 | -1 |
 b1
FIG.10A2
| 2 | 1 | 0 |
|---|---|---|
| 1 | 0 | -1 |
| 0 | -1 | -2 |
 b2
FIG.10A3
| 1 | 0 | -1 |
|---|---|---|
| 2 | 0 | -2 |
| 1 | 0 | 1 |
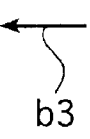 b3
FIG.10A4
| 0 | -1 | -2 |
|---|---|---|
| 1 | 0 | -1 |
| 2 | 1 | 0 |
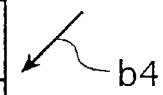 b4
FIG.10A5
| -1 | -2 | -1 |
|---|---|---|
| 0 | 0 | 0 |
| 1 | 2 | 1 |
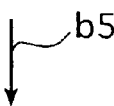 b5
FIG.10A6
| -2 | -1 | 0 |
|---|---|---|
| -1 | 0 | 1 |
| 0 | 1 | 2 |
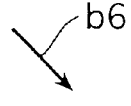 b6
FIG.10A7
| -1 | 0 | 1 |
|---|---|---|
| -2 | 0 | 2 |
| -1 | 0 | 1 |
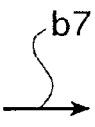 b7
FIG.10A8
| 0 | 1 | 2 |
|---|---|---|
| -1 | 0 | 1 |
| -2 | -1 | 0 |
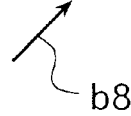 b8

IMAGE PROCESSING METHOD AND APPARATUS

This application is a divisional of co-pending application Ser. No. 09/294,996, filed on Apr. 20, 1999, the entire contents of which are hereby incorporated by reference and for which priority is claimed under 35 U.S.C. §120; and this application claims priority of application Nos. 10-125301 and 10-163182 filed in Japan on Apr. 20, 1998 and Jun. 11, 1998, respectively under 35 U.S.C. §119.

BACKGROUND OF THE INVENTION

This invention relates to an image processing method and an image processing apparatus. More specifically, the invention relates to the image processing method and the image processing apparatus employing that method for performing edge portion extraction so as to perform image processing operations such as sharpness enhancement, grain suppression and the like on a color image signal (image data) obtained by photoelectrically reading a color image or a subject, as well as the image processing method and the image processing apparatus employing that method for subjecting the obtained image data to specified image processing operations such as sharpness enhancement, grain suppression and the like to produce image data for output.

A new technology has recently been introduced and this is a printer that relies upon a digital color image reproduction system, where the color image recorded on a film such as a negative film, a reversal film, a color print or the like is read photoelectrically by a photoelectric conversion device such as a CCD or the like to obtain image signals corresponding to each of three primary colors, namely, red (R), green (G) and blue (B) and subsequently the obtained image signals are converted into digital image data signals which are then subjected to various image processing operations to be reproduced on recording materials such as color paper and the like and on display device such as a CRT (cathode ray tube) and the like. The printer operating on this digital color image reproducing system has been commercialized as a digital photoprinter.

In the digital photoprinter, color images can be reproduced in such a way that they have desired colors and gradations by subjecting obtained original image signals to image processing operations,-even if the color images are recorded on such as the negative film, the reversal film or the color print under unfavorable photographing conditions such as under-exposure, over-exposure or the like. The color images recorded on the negative film, the reversal film, color prints and the like can optionally be reproduced as different color images in colors and gradations.

Examples of these image processing operations include a method of enhancing sharpness (sharpness enhancement) of images by subjecting the image data signals representing a given image to image processing operations and a grain suppression method for decreasing grainy appearance of images by suppressing the grains of the film. Prior to performing the sharpness enhancement or grain suppression, the edge portion or a grain portion (or flat portion) must be extracted. Various methods for extracting the edge portion and the like have been known.

An exemplary known method for extracting the edge portion is of a type that adopts template matching. In this method, templates comprising some form, for example, a 3×3 matrix, are prepared with reference to a function distribution of pixel values of surrounding pixels of a pixel of interest to be decided which of the prepared template a given image is nearest to. Now, the pixel values of the pixel of interest and its surrounding pixels are set as $x_j$ (j=1, ..., n); k pieces of templates are prepared; a value of the $i_{th}$ template is set as $w_j^i$ (j=1, ..., n). A sum of products $p_i$ is calculated when i=1 ..., k by the following equation:

$$P_i = \Sigma_j w_j^i \cdot x_j \text{ (}\Sigma\text{is a sum when } j \& 32\ 1, \ldots, n)$$

It is decided that the template which gives the maximum of $p_i$ matches with the given image.

Consider, for example, a case where eight templates a1 to a8 as shown in FIG. 10 are given to the image composed of the pixel of interest and eight pieces of its surrounding pixels as shown in FIG. 11A. Each of these templates a1 to a8 corresponds to each of directions to edges as shown by arrows b1 to b8. Operators shown in such templates are called as 'Sobel' operators with which each of the sums of products p1 to p8 is calculated according to the above equation. The sum of products p1 of the template a1 is calculated as follows:

$$p1=1\times1+2\times2+1\times3+0\times9+0\times10+0\times4+(-1)\times8+(-2)\times7+(-1)\times5=-19$$

Other cumulated sums p2 to p8 corresponding to respective other templates a2 to a8 are calculated in the same manner. The results are as follows:

p2=−8
p3=11
p4=20
p5=19
p6=8
p7=−11
p8=−20

As a result, p4 shows the maximum value so that the direction obliquely downward from right to left that the arrow b4 of the template a4 indicates shows the direction to the edge (density gradient, that is, direction of gradient) of the pixel of interest 10, as shown in FIG. 11B, and, in this case, the value 20 of the sum of products p4 shows the intensity of the gradient. In such way, the gradient of the pixel of interest (vector quantity) is calculated. Subsequently, with reference to pixels 1 and 5 that are adjacent to the pixel of interest 10 and positioned in the direction of 90 degrees from its gradient direction, each of images with a 3×3 matrix around each of the pixels is calculated employing the above templates a1 to a8 in the same manner as above to obtain the gradient direction of each of the adjacent pixels 1 and 5. If at least one of the pixels 1 and 5 is in the direction of 45 degrees or less from the direction of the pixel of interest 10, the pixel of interest is decided as the edge portion, that is, having connectivity.

Though the conventional method for extracting the edge portion described above is of course capable of extracting the edge portion to some extent, it in cases detects the grain portion as the edge portion falsely, thereby causing deterioration of quality of a finished image.

As illustrated in FIG. 9A, an example shows that, besides white lines which were original edge portions, the grain portions were falsely decided as the edge portions so that a number of white grains have remained.

As already described, in recent years, the digital color image reproduction technique has been known that photoelectrically reads the image in a frame recorded on a photographic film by a reading sensor such as a CCD sensor or the like, subjects the thus read digital image data to image processing operations including enlargement, reduction and other various corrections and allows the image to be formed on a recording material by a laser beam modulated on the basis of the digital image data that has been processed imagewise.

In such technique that digitally reads the image in the frame by the reading sensor such as the CCD sensor or the like, following steps have been taken in order to realize an accurate reading of the image: the image in the frame is read preliminarily (so-called prescan is performed); reading conditions (for example, light quantity to be irradiated to the image in the frame, charge storage time of CCD or the like) are determined in accordance with density and the like of the image in the frame; and the image in the frame is read again under the thus determined reading conditions (so-called fine scan is performed).

At the time of the prescan, correction values to be adapted to various correction processing on color gradation, hypertone, hypersharpness, granularity and the like are each detected on the basis of the read image so that the image read by the fine scan is subjected to correction processing based on each of the thus detected correction values.

The granularity that is one of the objects to be subjected to the correction processing is referred to a rate of graininess or coarseness of the image on the film. Higher the granularity finer the image. The granularity is referred in one case to a rate when compared with that of a specified reference film and in another case to a relative rate within one image on the same film.

The granularity is one of the important factors to determine image quality. Granularity corrections are disclosed in, such as, Unexamined Published Japanese Patent Application (tokkai) No. 63-272173 where the exposure condition of each image in the frame of a negative color film is decided before negative/positive reversal processing is performed and thereafter a method for variably correcting the granularity corresponding to each image in the frame on the basis of the exposure condition of each image in the frame obtained by this decision has been performed.

Sharpness enhancement processing operations such as hypersharpness or the like is a processing for producing a sharp image having a forceful effect by means of enhancing an edge portion of the image. Moreover, this sharpness enhancement processing has been performed by the method where exposure conditions, for example, under-exposure or over-exposure, in each image in the frame on the negative color film is decided and thereafter sharpness enhancement rate, that is, a degree of the sharpness enhancement adapted to each image in the frame has been variably corrected on the basis of the result obtained by the above decision.

However, such correction method of the granularity and the degree of the sharpness enhancement has applied correction values that have been detected in accordance with the exposure condition, for example, under-exposure or over-exposure, of the image recorded in a frame to the whole image of the frame so that the method has a problem that some region in a frame has been overly corrected or otherwise insufficiently corrected.

SUMMARY OF THE INVENTION

The present invention has been accomplished under such circumstances and has an first object providing an image processing method and an image processing apparatus capable of raising extraction precision of an edge portion to a higher level than that in the prior art in order to precisely extract the edge portion, thereby increasing image quality.

A second object of the invention is to provide an image processing method and apparatus embodying the method that are capable of performing a minute correction of granularity and sharpness enhancement degree in accordance with the difference of granularities in an image recorded in one frame, or the difference of an edge portion and an flat portion (grainy portion) in the image recorded in one frame.

In order to attain the first object described above, a first aspect of the invention provides an image processing method for subjecting digital image data of color image signals to specified image processing, comprising the steps of: calculating gradients representing directions and intensities of a pixel of interest and its surrounding pixels from pixel values of the pixel of interest and its surrounding pixels of image composed of the color image signals that are to be subjected to image processing; storing the calculated gradients; calculating connectivity of the pixel of interest with its surrounding pixels from the directions of the stored gradients; calculating directivities of respective R, G and B of the pixel of interest by calculating gradients of respective R, G and B channels of the pixel of interest; and deciding whether the pixel of interest is an edge portion or not from the connectivity and the directivities of respective R, G and B to extract the edge portion.

Preferably, when the connectivity of the pixel of interest with its surrounding pixels is calculated, a direction of gradient of the pixel of interest and directions of gradients of nearby pixels of the pixel of interest are compared, and thereby, if the directions of a specified number of the nearby pixels agree with a specified condition, it is decided that the connectivity exists.

Preferably, when the connectivity of the pixel of interest with its surrounding pixels is calculated, if the directions of gradient of the adjacent pixels that are located on opposite sides of the pixel of interest in a direction of 90 degrees from the direction of gradient of the pixel of interest are within 45 degrees, it is decided that the connectivity exists.

In order to solve the second object described above in addition to the first object, it is preferable that the image processing method described above, further comprises the steps of: calculating at least one correction amount of a degree of sharpness enhancement and a granularity in each of a plurality of specified regions based on whether the plurality of the specified regions formed by dividing the image data include the edge portion or not; correcting at least one of the degree of the sharpness enhancement and the granularity of the image data based on the calculated correction amount of each specified region; and subjecting the image data to specified image processing including correction of at least one of the degree of the sharpness enhancement and the granularity to produce output image data.

It is also preferable that the above-described image processing apparatus, further comprises the step of calculating a correction amount of the granularity in each of a plurality of specified regions based on each density of the plurality of the specified regions formed by dividing the image data.

In order to solve the first object, a second aspect of the invention provides an image processing apparatus for subjecting digital image data of color image signals to specified image processing, comprises: calculating means for calculating gradients of a pixel of interest and its surrounding pixels that represent directions and intensities of an edge from pixel values of the pixel of interest and its surrounding pixels of image composed of the color image signals that are to be subjected to image processing; storing means for storing the calculated gradients; calculating means for calculating connectivity of the pixel of interest with its surrounding pixel from the directions of the stored gradients; calculating means for calculating directivities of respective R, G and B of the pixel of interest by calculating gradients of respective R, G and B channels of the pixel of interest; and deciding means for deciding whether the pixel of interest is an edge portion or not from the connectivity and the directivities of respective R, G and B, thereby edge portion extraction is performed.

Preferably, the calculating means for calculating the connectivity of the pixel of interest with its surrounding pixel is to compare a direction of gradient of the pixel of interest and directions of gradients of nearby pixels, and wherein, if the directions of a specified number of the nearby pixels agree with a specified condition, it is decided that the connectivity exists.

Preferably, the calculating means for calculating the connectivity of the pixel of interest with its surrounding pixels decides that the connectivity exists, if the directions of gradients of the adjacent pixels that are located on opposite sides of the pixel of interest in a direction of 90 degrees from the direction of the gradient of the pixel of interest are both within 45 degrees from the direction of the gradient of the pixel of interest.

In order to solve the second object in addition to the first object, it is preferable that the above-described image processing apparatus, further comprises: sharpness enhancement degree correction amount calculating means for calculating a correction amount of a degree of sharpness enhancement in each specified region, based on whether a plurality of specified regions formed by dividing the image data include the edge portion or not; and sharpness enhancement degree correction means for correcting the degree of the sharpness enhancement of the image data based on the calculated correction amount of each specified region by the sharpness enhancement degree correction amount calculating means, wherein the image data is subjected to specified image processing including correction of the degree of the sharpness enhancement to produce output image data.

It is also preferable that the above-described image processing apparatus, further comprises: granularity correction amount calculating means for calculating a correction amount of a granularity in each specified region based on each density of the plurality of the specified regions; and granularity correction means for correcting the granularity of the image data based on the correction amount of each specified region calculated by the granularity correction amount calculating means.

Preferably, the granularity correction amount calculating means further calculates a correction amount of the granularity in each specified region based on whether the plurality of the specified regions include the edge portion or not.

It is further preferable that the above-described image processing apparatus, further comprises: granularity correction amount calculating means for calculating a correction amount of a granularity in each specified region based on whether a plurality of specified regions formed by dividing the image data include the edge portion or not; and granularity correction means for correcting the granularity of the image data based on the correction amount of each specified region calculated by the granularity correction amount calculating means.

In each of the above aspects, it is preferable that the specified condition with which the directions of the specified number of the nearby pixels agree is a condition that 50% or more of the directions of the nearby pixels are within 45 degrees from the direction of the pixel of interest. Alternatively, it is more preferable that the specified condition with which the directions of the specified number of the nearby pixels agree is a condition that 60% or more, 70% or more, 80% or more, or 90% or more of the directions of the nearby pixels are within 45 degrees or 30 degrees from the direction of the pixel of interest.

Preferably, the nearby pixels are referred to any one of 1×3 pixels, 1×5 pixels, 3×5 pixels and 3×7 pixels excluding the pixel of interest placed in center of each of above pixel configurations where more pixels are arranged in the direction perpendicular to the direction of gradient of the pixel of interest than the direction of gradient.

Preferably, deciding conditions of the connectivity of the pixel including a way of selecting the nearby pixels, the specified number of the nearby pixels whose directions agree with the specified condition and the specified condition with which the directions of the specified number of the adjacent pixels agree are determined in accordance with at least one of an original kind, an original size, a print magnification, a camera kind and an exposure condition.

Preferably, the gradients of the pixel of interest and its surrounding pixels based on the color image signals are calculated based on a luminance signal of the color image signals.

In order to solve the above second object, a third aspect of the invention provides an image processing apparatus for photoelectrically reading an image recorded on a film or a subject so as to obtain image data which is subjected to specified image processing to produce output image data, comprises: granularity correction amount calculating means for calculating a correction amount of a granularity in each specified region based on each density of a plurality of specified regions formed by dividing the image data; and granularity correction means for correcting the granularity of the image data based on the correction amount of each specified region calculated by the granularity correction amount calculating means.

According to this aspect, granularity correction amount is not calculated on the basis of exposure condition of the image photographed in one frame (hereinafter called as image in one frame) as a whole; however, the image data of the image in one frame is divided into respective specified regions, the granularity correction amount calculating means calculates the granularity correction amount of each of the specified regions and the granularity correction means corrects the granularity of the image data on the basis of the obtained correction amount. Namely, granularity correction can be performed by taking the density of partial image (a plurality of densities) of the image in one frame into consideration so that a careful and minute correction of the granularity can be realized.

It should be noted that, in this aspect, the method for dividing the image data of the image in one frame into respective specified regions is not limited to any particular way and any appropriate methods such as dividing it equally in a checkered board pattern, dividing it in a honeycomb pattern, in a radial pattern, in a concentric circular pattern or in any combination thereof keeping the center of the image data in the centers of patterns, dividing it into a central part in which a principal subject is apt to be positioned with high possibility and the other part and the like can be optionally selected.

Preferably, the granularity correction means corrects the image data as a whole by selecting an optimal value from among correction amounts calculated on respective specified regions.

Namely, according to the invention, granularity correction can be performed in accordance with partial regions such as one specified region, a plurality of specified regions and the like in the image in one frame where the principal subject is recorded so that granularity is not set in an average way with the exposure condition of the frame as a whole, but the image data can be corrected to have the granularity suitable for a part of principal regions.

Preferably, the granularity correction means corrects image data in each specified region based on the correction amount corresponding to the respective specified region.

Namely, according to the invention, granularity correction is performed to each specified region on the basis of the calculated correction amount of each of specified regions formed by dividing the image in one frame so that different granularity correction in one frame can be realized thereby allowing a careful and minute granularity correction in accordance with the image in one frame to be performed.

Preferably, the granularity correction means corrects only the image data in a specified region placed at a previously predetermined position based on the correction amount calculated from the specified region at the previously predetermined position.

In other words, according to the invention, since the granularity correction in one specified region previously predetermined or a plurality of specified regions previously predetermined is calculated among previous specified regions obtained by dividing the image in one frame and thereafter only the image data on such one specified region previously predetermined or a plurality of predetermined specified regions is corrected, the granularity correction can be partly performed within one frame.

When a plurality of specified regions are selected, the image data can be corrected by means of any one of the following ways: the granularity correction amount of each of such specified regions is calculated to correct the image data corresponding to each of such specified regions; the granularity correction amount of each of such specified regions is calculated to correct the image data in a plurality of specified regions as a whole in accordance with most appropriate correction amount in the correction amounts; the granularity correction amount of a plurality of specified regions as a whole is calculated to correct the image data in a plurality of specified regions as a whole.

Therefore, for example, after the granularity correction of the whole image region in one frame has been performed on the basis of exposure condition as has been done conventionally, only the specified region in either under-corrected condition or over-corrected condition is selected so that a further granularity correction can be performed whereupon a more careful and minute granularity correction can be realized.

It is of course possible that only the specified region at the specific position of the image in one frame before subjected to the granularity correction is selected to perform the granularity correction on the selected region only or the method of the granularity correction is changed in accordance with the quality of the image data which is to be subjected to the granularity correction.

Preferably, the specified region is a region composed of one pixel. Namely, the most careful and minute granularity correction can be performed by composing the specified region of one pixel.

It is preferable that the above-described image processing apparatus, further comprises principal subject extraction means for extracting an occupied region of a principal subject from the image data, wherein, as the specified region, the occupied region extracted by the principal subject extraction means or the other region than the occupied region is selected.

By taking the above arrangement, since correction amount of the principal part within the image can be appropriately obtained in accordance with the image photographed in each frame, the granularity correction can be performed in accordance with the image in a careful and minute manner.

Preferably, the specified region is a set of pixels having specified density obtained from a density cumulated histogram of the image data.

Namely, since granularity of a region with higher density in the image data is better than that of a region with lower density, local deterioration of granularity to be possibly caused by the density difference within the image data in one frame can be prevented by changing the granularity correction amount according to the density of the principal part within the image that is obtained by the density cumulated histogram of the image data.

Preferably, the density is a relative density difference from a base density of a film applied. Hereby density, appropriate granularity correction amount can be in any cases calculated even if a film with different film base density is employed.

Moreover, the granularity correction condition used as a reference differs between negative film and reversal film, among film sensitivities, and among film kinds. Therefore, it is also preferable that the aforementioned image processing apparatus further comprises film kind distinguishing means for distinguishing a film kind, wherein the granularity correction amount calculating means adjusts a reference value for calculating the correction amount in accordance with the film kind provided from the film kind distinguishing means. By this arrangement, the granularity correction condition as the reference can be adjusted in accordance with the film kind which is to be subjected to the correction processing so that the granularity correction can be performed in a more careful and minute manner.

It is further preferable that the aforementioned image processing apparatus further comprises: sharpness enhancement degree correction amount calculating means for calculating the correction amount of a degree of sharpness enhancement in each specified region based on whether the plurality of specified regions formed by dividing the image data include an edge portion or not; and sharpness enhancement degree correction means for correcting the degree of the sharpness enhancement of the image data based on the correction amount of each specified region calculated by the sharpness enhancement degree correction amount calculating means.

Preferably, the granularity correction amount calculating means further calculates the correction amount of the granularity in each specified region based on whether the plurality of the specified regions formed by dividing the image data include an edge portion or not.

In order to solve the above second object, a forth aspect of the invention provides an image processing apparatus for photoelectrically reading an image recorded on a film or a subject so as to obtain image data which is subjected to specified image processing to produce output image data, comprises: sharpness enhancement degree correction amount calculating means for calculating a correction amount of a degree of sharpness enhancement in each specified region based on whether a plurality of specified regions formed by dividing the image data include an edge portion or not; and sharpness enhancement degree correction means for correcting the degree of the sharpness enhancement of the image data based on the correction amount of each specified region calculated by the sharpness enhancement degree correction amount calculating means.

In order to solve the above second object, a fifth aspect of the invention provides an image processing method for photoelectrically reading an image recorded on a film or a subject so as to obtain image data which is subjected to specified image processing to produce output image data, comprises the step of: calculating at least one of a correction amount of a granularity in each specified region based on each density of a plurality of the specified regions formed by dividing the image data and a correction amount of a degree of a sharpness enhancement in each specified region based on whether the plurality of the specified regions formed by dividing the image data include an edge portion or not, wherein the granularity or the degree of the sharpness enhancement of the image data is corrected based on the calculated correction amount of each region.

Preferably, the correction amount of the granularity in each of the specified regions is further calculated based on whether the plurality of the specified regions include the edge portion or not.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 1 is a block diagram showing an embodiment of a digital photoprinter that utilizes an image processing apparatus performing an image processing method of the invention;

FIG. 8 is a flowchart schematically showing an edge extraction process in an embodiment of the invention;

FIG. 9 is photographs substituting for drawings that compare effectiveness of embodiments of the invention with that of the prior art where

FIGS. 10($a$1) to ($a$8) are illustrations showing exemplary templates employed in edge portion extraction;

DETAILED DESCRIPTION OF THE INVENTION

Figure 2A:
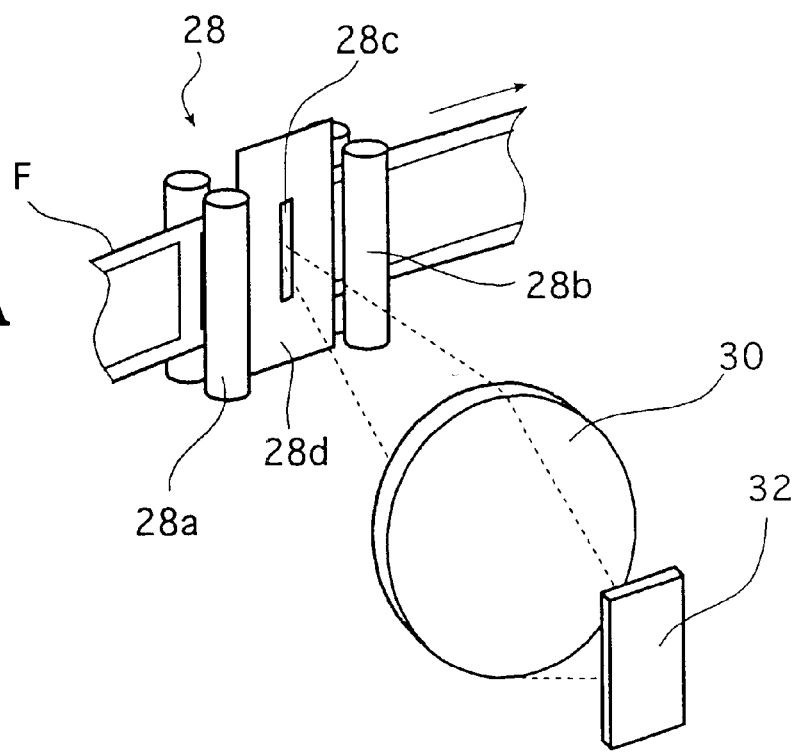
FIG. 2A is a schematic perspective view illustrating an embodiment of a carrier to be mounted on the digital photoprinter shown in FIG. 1.

An image processing method and an image processing apparatus of the invention are now described in detail with reference to preferred embodiments shown in the accompanying drawings.

The image processing method of the first embodiment of the invention and the image processing apparatus of the a second embodiment of the invention are now described with reference to FIGS. 1 to 12.

FIG. 1 is a block diagram showing an embodiment of a digital photoprinter that utilizes the image processing apparatus of the second embodiment of the invention which performs the image processing method of the first embodiment of the invention.

The digital photoprinter (hereinafter called as photoprinter) 10 shown in FIG. 1 comprises a scanner (image reading apparatus) 12 for photoelectrically reading images recorded on a film F, an image processing apparatus 14 which performs image processing operations such as an edge portion extraction and the like from image data (image information) read by the scanner 12 and with which the photoprinter 10 is as a whole manipulated and controlled, and an image recording apparatus 16 which performs image-wise exposure of a light-sensitive material (photographic paper) with light beams modulated in accordance with the image data delivered from the image processing apparatus 14 and which performs development and other necessary processing to produce a (finished) print.

Connected to the image processing apparatus 14 are a manipulating unit 18 having a keyboard 18a and a mouse 18b for inputting and setting various conditions, selecting and commanding a specific processing step and entering a command and so forth for effecting color/density correction, as well as a monitor 20 for representing the image captured with the scanner 12, various manipulative commands and pictures for setting and registering various conditions.

The scanner 12 is an apparatus with which the images recorded on the film F are read photoelectrically frame by frame. It comprises a light source 22, a variable diaphragm 24, a diffuser box 26 which diffuses the reading light incident on the film F so that it becomes uniform across the plane of the film F, a carrier 28 for the film F, an imaging lens unit 30, an image sensor 32 having three line CCD sensors capable of reading respective R (red), G (green) and B (blue) color image densities, an amplifier (Amp) 33 and an A/D (analog/digital) converter 34.

In the photoprinter 10, dedicated carriers 28 are available that can be loaded into the body of the scanner 12 in accordance with the type or the size of the film F used (e.g. whether it is a film of the Advanced Photo System (APS), a negative or reversal film F of 135 size), the format of the film F (e.g. whether it is a strip or a slide) or other factors. By replacing one carrier 28 with another, the photoprinter 10 can be adapted to process various kinds of films in various modes. The images (frames) that are recorded on the film and which are subjected to the necessary procedure for print production are transported to a specified reading position by means of the carriers 28.

As is well known, magnetic recording media are formed on the APS film to record, for example, cartridge ID, film type and the like. Various kinds of other information including shooting date and time, developing date and time, camera type, developing machine type and the like can be recorded on the APS film. The carrier 28 adapted to the APS film (cartridge) is provided with a means for reading these magnetic information (reading means), thereby reading magnetic information when the film is transported to a reading position. The read information are thereafter sent to the image processing apparatus 14.

The scanner 12 captures the images recorded on the film F in the following manner: uniform reading light emitted from the light source 22 that has its quantity adjusted by means of the variable diaphragm 24 and the diffusion box 26 is incident on the film F held in the specified reading position by the carrier 28 and thereafter passes through the film to produce projected light bearing the image recorded on the film F.

Inputting color image signals is not limited to reading the light that has passed through the film and it can also be performed by reading reflection originals or images recorded by a digital camera.

The illustrated carrier 28 is adapted to handle a web (strip) of the film F of 135 size with 24 frames or of a cartridge of the APS. As shown schematically in FIG. 2A, the carrier 28 comprises a pair of transport roller pairs 28a and 28b and a mask 28d having a slit 28c. A pair of the transport roller pairs 28a and 28b are provided on opposite sides of the specified reading position in an auxiliary scanning direction which is perpendicular to the direction in which the three line CCD sensors corresponding to respective R, G and B in the image sensor 32 extend (the main scanning direction) and they transport the film F with its length being parallel to the auxiliary scanning direction as it is in registry with the reading position. The slit 28c defines the projected light from the film F to have a specified narrow shape, is in registry with the reading position and extends in the main scanning direction.

Being held in registry with the reading position, the film F is transported in the auxiliary scanning direction by means of the carrier 28 as it is illuminated with the reading light. Consequently, the film F is subjected to two-dimensional slit scan with the reading light passing through the slit 28c extending in the main scanning direction, whereupon the image of each frame recorded on the film F is captured.

The projected light from the film F is focussed by the imaging lens unit 30 to form a sharp image on the light-receiving plane of the image sensor 32.

Figure 2B:
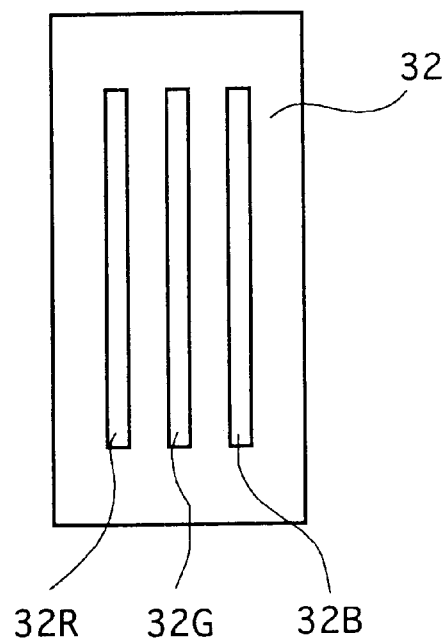
FIG. 2B is a conceptual diagram showing an embodiment of an image sensor of the digital photoprinter shown in FIG. 1.

As shown in FIG. 2B, the image sensor 32 is a 3-line color CCD sensor comprising a line CCD sensor 32R for reading an R image, a line CCD sensor 32G for reading a G image, and a line CCD sensor 32B for reading a B image. As already mentioned, the respective line CCD sensors extend in the main scanning direction. The projected light from the film F is separated into three primary colors R, G and B and captured photoelectrically by means of the image sensor 32.

Output signals of respective R, G and B colors outputted from the image sensor 32 are amplified with Amp 33, sent to the A/D converter 34, converted to, for example, respective R, G and B digital image data in 12 bits with the A/D converter 34 and outputted to the image processing apparatus 14.

In the scanner 12, the images recorded on the film F are captured by two scans: prescan (the first image reading) for reading the images at low resolution and fine scan (the second image reading) for obtaining image data for output images.

The prescan is performed under preset reading conditions that ensure that all images on the film F to be handled by the scanner 12 can be read without saturating the image sensor 32.

On the other hand, the fine scan is performed under reading conditions that are set for each frame using the prescanned data such that the image sensor 32 is saturated at a slightly lower density than the minimum density of the image (frame) of interest. The output image signals of prescan and fine scan are essentially the same image data except for resolution and output image signal levels.

It should be noted that the scanner 12 to be used in the photoprinter 10 is by no means limited to a type that relies upon a slit scan reading technique described above but it may be of another type that relies upon an areal reading technique by which the whole film image in one frame is read at a time.

In this alternative approach, an area sensor such as an area CCD sensor or the like is used. A means for inserting R, G and B color filters between the light source 22 and the film F is arranged. By inserting each of these color filters in the optical path of the light ejected from the light source 22, reading light that has passed through each of the color filters is obtained. A whole area of the film F is irradiated by the reading light for allowing the light to pass through the film F thereby producing transmitted light. Then, this transmitted light forms a sharp image on the area CCD sensor to finally read the whole image of the film. Image reading is thus performed by separating the image recorded on the film F into three primary colors by sequentially changing R, G and B color filters one by one.

As already mentioned, the digital image data signals outputted from the scanner 12 are fed into the image processing apparatus 14 that performs the image processing method of the invention.

Figure 3:
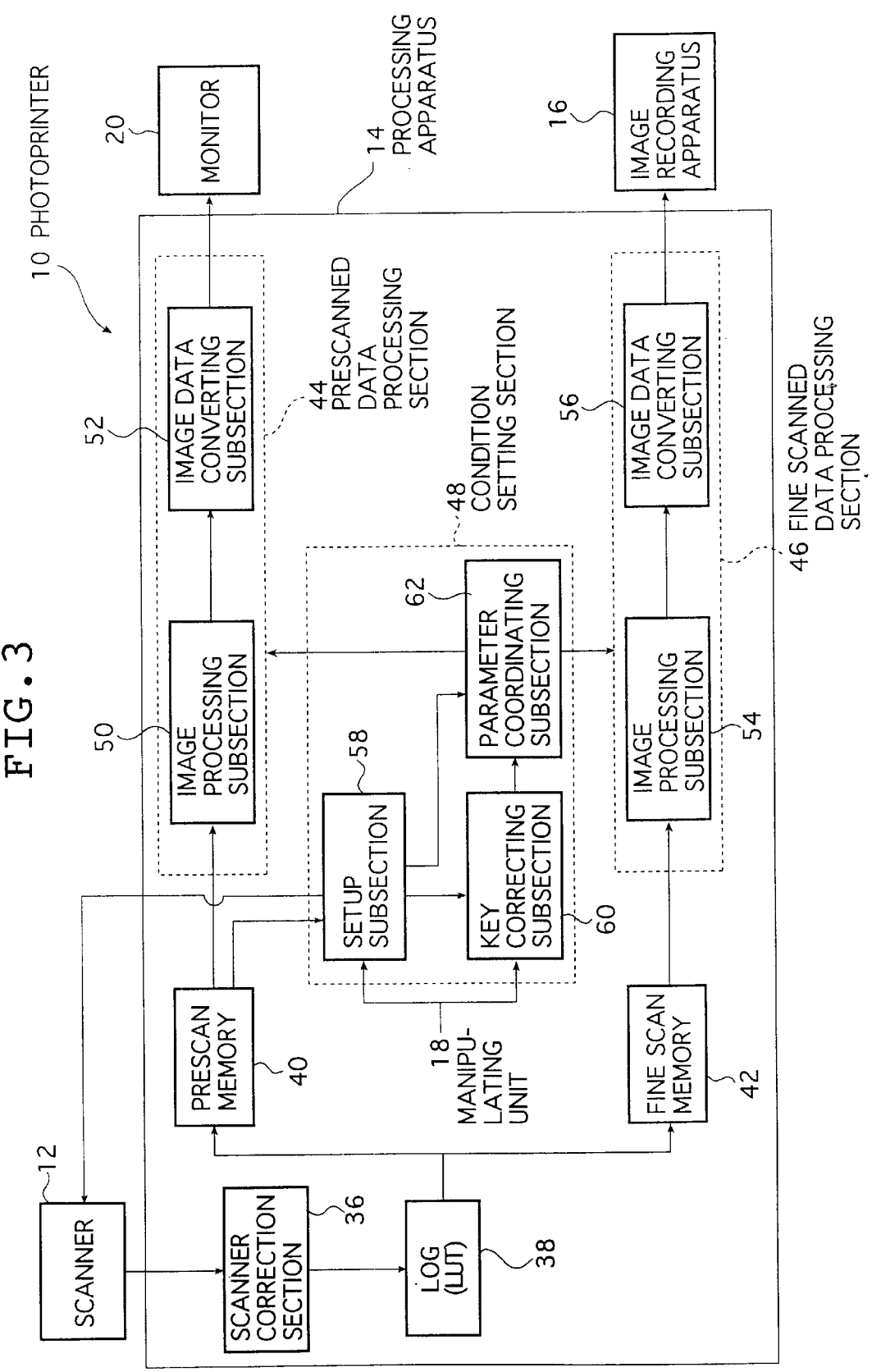
FIG. 3 is a block diagram showing an embodiment of the image processing apparatus performing the image processing method of the invention of the digital photoprinter shown in FIG. 1.

FIG. 3 is a block diagram showing the image processing apparatus (hereinafter called as processing apparatus) 14 of the invention.

The processing apparatus 14 comprises a scanner correcting section 36, a LOG converter 38, a prescan (frame) memory 40, a fine scan (frame) memory 42, a prescanned data processing section 44, a fine scanned data processing section 46 that performs the edge portion extraction which is characteristic to the invention and various kinds of image processing operations and a condition setting section 48.

However, FIG. 3 shows only members related to image processing and, besides these members, the processing apparatus 14 includes a CPU for controlling and managing the overall operation of the photoprinter 10 including the processing apparatus 14, memories for storing the information necessary for, such as, the operation of the photoprinter 10 and other members. The manipulating unit 18 and the monitor 20 are connected to related members via the CPU and the like (CPU bus).

The R, G and B image signals such as digital image data in 12 bits that were inputted into the processing apparatus 14 from the scanner 12 is then inputted in the scanner correcting section 36.

The scanner correcting section 36 performs data corrections on read image data such as DC offset correction, dark time correction, defect pixel correction, shading correction and the like so as to correct uneven sensitivity of R, G and B digital image data among pixels and a dark electric current caused by three line CCD sensors, that is, 32R, 32G and 32B, of the image sensor 32 of the scanner 12. The digital image signals subjected to correction processing and the like of their uneven sensitivities among pixels and their dark electric current with the scanner correcting section 36 are outputted in the LOG converter.

The LOG converter 38 subjects the digital image data to logarithmic conversion processing to effect gradation conversion thereby converting the digital image data into digital image density data where, for example, digital image data in 12-bit that has been corrected at the scanner correcting section 36 is converted into digital image density data in 10-bit (0~1023), for example, employing look-up tables (LUTs).

With reference to the digital image density data converted by the LOG converter 38, prescanned image data and fine scanned image data are stored in the prescan memory 40 and the fine scan memory 42 respectively.

Data obtained by prescanning the film F with the scanner 12 is subjected to various kinds of data corrections and logarithmic conversion to produce image density data in low resolution of whole one frame of the film F. The prescan memory 40 is a frame memory for storing according to respective R, G and B colors image density data in low resolution of a whole frame of the film F that has been obtained by prescanning the film F with the scanner 12 and that has been subjected to various data correction and logarithmic conversion processing. The prescan memory 40 must have capacity enough to store at least image density data of three colors of R, G and B of one frame of the film F. The prescan memory 40, however, may have capacity to store image density data of a plurality of frames or may be composed of a number of memories that each have a storing capacity of one frame of data.

The prescanned image data stored in the prescan memory 40 is read out to the prescanned data processing section 44.

On the other hand, the fine scan memory 42 is a frame memory that stores according to respective R, G and B colors the processed image density data in high resolution of whole one frame of the film F which were obtained by fine scanning the film F with the scanner 12 and subjected to various kinds of data corrections and logarithmic conversion processing. Preferably, the fine scan memory 42 has capacity enough to store the image density data of three colors (R, G and B) of at least two frames of the film F, and the fine scan memory 42 reads out the image density data of one frame as it stores the image density data of another frame, whereupon various kinds of processing operations for executing the edge portion extraction that is characteristic to the invention can concurrently be performed at the fine scanned data processing section 46. The fine scan memory 42 according to the invention is not limited thereto and it may have capacity of storing the image density data of one frame so as to process the data frame by frame. Moreover, the fine scan memory 42 may have a number of memories that each have a storing capacity of the data of one frame, whereupon the memory 42 can be utilized as a toggle memory or the like.

The fine scanned image data stored in the fine scan memory 42 is read out to the fine scanned data processing section 46.

The prescanned data processing section 44 that subjects the prescanned image data stored in the prescan memory 40 to various kinds of image processing necessary for representing the data on the monitor 20 comprises an image processing subsection 50 and an image data converting subsection 52.

The image processing subsection 50 subjects the image data that was read with the scanner 12 in accordance with image processing conditions set in a condition setting section 48 which will be described later and that was subsequently stored in the prescan memory 40 to specified image processing operations such as gradation correction, color conversion, density conversion and the like by means of a look-up table (hereinafter represented as LUK) or a matrix (hereinafter represented as MTX) operation so as to reproduce a color image of desired quality on a CRT (cathode ray tube) representation screen of the monitor 20 that will be described later.

The image data converting subsection 52 optionally thins out the image data processed by the image processing subsection 50 so as to comply with the resolution of the monitor 20 and also converts the image data with a 3D- (three dimensional) LUT or the like into image data which is so adapted to the representation on the monitor 20 that the image data can be represented on the monitor 20.

Processing conditions in the image processing subsection 50 are set in the condition setting section 48 that will be described later.

On the other hand, the fine scanned data processing section 46 that subjects the fine scanned image data stored in the fine scan memory 42 to various kinds of image processing which are necessary for outputting the data as a color print from an image recording apparatus and the edge portion extraction of the invention comprises an image processing subsection 54 and an image data converting subsection 56.

The image processing subsection 54 that will be described in detail later, but here in brief, is the site where the image data which is read with the scanner 12 in accordance with image processing conditions set in the condition setting section 48 that will be described later and which is subsequently stored in the fine scan memory 42 is subjected to various kinds of image processing operations such as color balance adjustment, gradation adjustment, color adjustment, density adjustment, saturation adjustment, electronic magnification conversion, sharpness enhancement (edge enhancement; sharpening) and the like by employing a LUT, an MTX operation unit, a low-pass filter, an adder/subtracter and the like so as to be capable of reproducing the color image on color paper with density, gradation and color tone desired as a color print or the image of high quality subjected to sharpness enhancement, grain control and the like after the edge portion extraction that is the object of the invention has been performed.

The image data converting subsection 56 converts the image data processed with the image processing subsection 54 into another image data that is capable of being recorded imagewise with the image recording apparatus 16 by employing, for example, the 3D-LUT and the like and then sends the thus converted image data to the image recording apparatus 16.

The image recording apparatus 16 is the site where the color image is outputted as a reproduced and finished print based on the image data outputted from the fine scanned data processing section 46.

Processing conditions in the image processing subsection 54 are set in the condition setting section 48.

The condition setting section 48 sets various kinds of conditions to be employed in the fine scanned data processing section 46. The condition setting section 48 comprises a setup subsection 58, a key correcting subsection 60 and a parameter coordinating subsection 62.

The setup subsection 58 uses the prescanned image data or the like to set the reading conditions for fine scan and supply them to the scanner 12; in addition, the setup subsection 58 forms (or calculates) the image processing conditions in the prescanned data processing section 44 and the fine scanned data processing section 46 and supplies them to the parameter coordinating subsection 62.

Specifically, the setup subsection 58 reads out from the prescan memory 40 the prescanned image data which is then used for forming density histograms and calculating image characteristic quantities of average density, LATD (large area transmission density), highlights (minimum density) and shadows (maximum density) and the like.

Based on the calculated image characteristic quantities, reading conditions of fine scan such as light quantity of the light source 22, the stop-down value of the variable diaphragm 24, storage time (of each of line CCD sensors 32R, 32G and 32B) of the image sensor 32 and the like are set in a manner that the image sensor (line CCD sensors 32R, 32G and 32B) is to be saturated with a little lower density than the minimum density of the image of interest. Reading conditions of fine scan may be changed from those of prescan in the following manner: all factors related to output level of the image sensor may be changed; any one of factors such as the stop-down value and the like may be changed; or a plurality of factors such as the stop-down value and the storage time and the like may be changed.

The setup subsection 58 sets image processing conditions of the aforementioned color balance adjustment, gradation adjustment and the like, in accordance with density histogram, image characteristic quantities and commands optionally entered by the operator and the like.

The key correcting subsection 60 calculates the adjustment amounts of image processing conditions (e.g. the amount of correction of LUTs) in accordance with adjustment amounts of density (brightness), color, contrast, sharpness, saturation and so forth that have been set by the keyboard 18a or by the key (not shown) arranged in a manipulating unit 18 or various commands entered by the mouse 18b and sets a parameter, thereby supplying the calculated adjustment amounts and the set parameter into the parameter coordinating subsection 62.

After receiving the image processing conditions that have been set by the setup subsection 58, the parameter coordinating subsection 62 sets the supplied image processing conditions in the image processing subsection 50 of the prescanned data processing section 44 and also in the image processing subsection 54 of the fine scanned data processing section 46. Furthermore, in accordance with the adjustment amounts calculated in the key correcting subsection 60, the parameter coordinating subsection 62 either corrects (adjusts) the image processing conditions set in various sites or makes another setting of image processing conditions.

The image processing subsection 54 of the fine scanned data processing section 46 that performs the edge portion extraction characteristic to the invention will now be described in detail.

Figure 4:
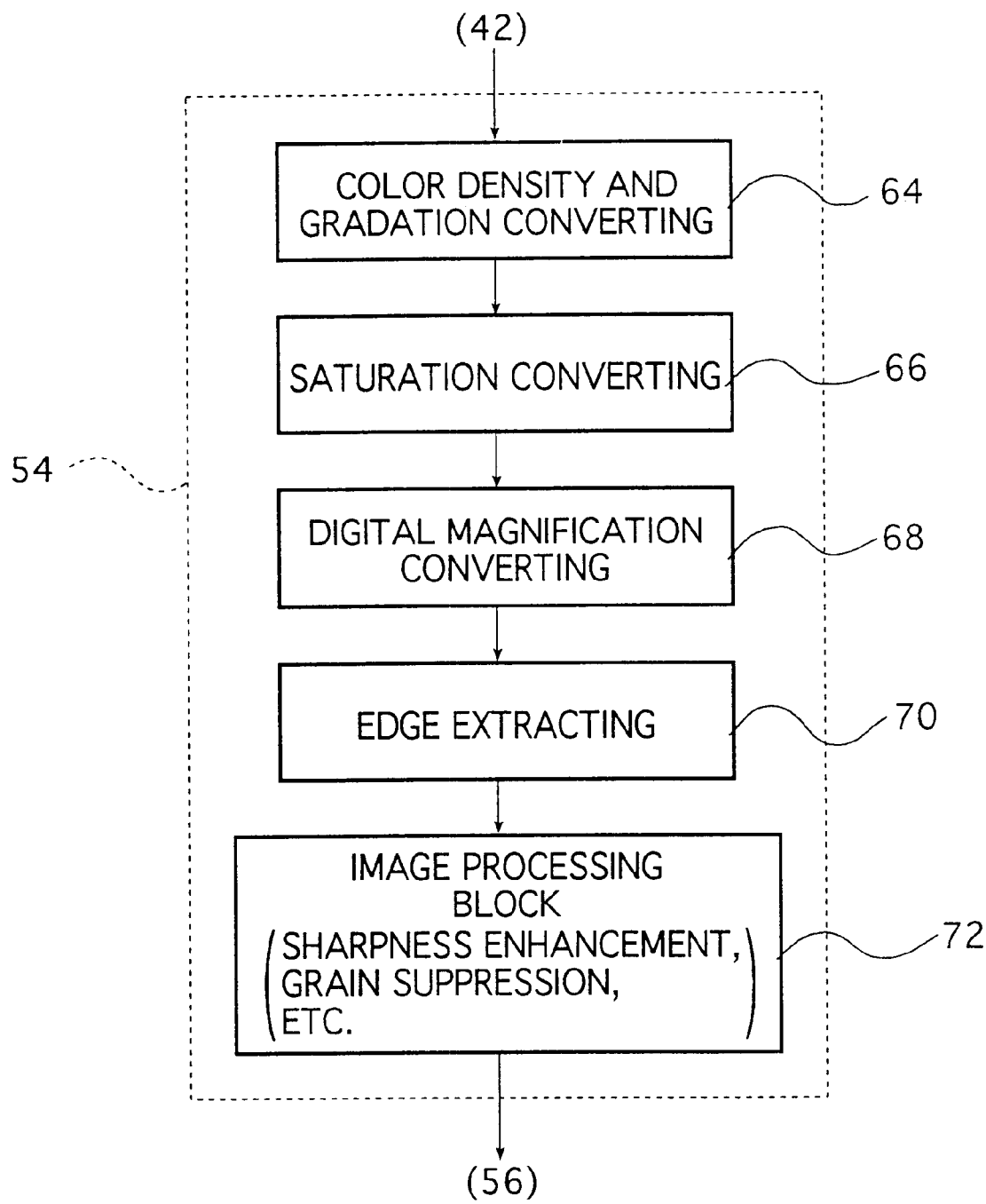
FIG. 4 is a block diagram showing an embodiment of an image processing subsection of a fine scanned image data processing section of the image processing apparatus shown in FIG. 3.

FIG. 4 is a block diagram schematically showing an embodiment of the image processing subsection 54. As shown in FIG. 4, the image processing subsection 54 comprises a color density and gradation converting device 64 that converts density, color and gradation of the image data, a saturation converting device 66 that converts a saturation of the image data, a digital magnification converting (electronic magnification converting) device 68 that converts the number of pixels of the image data, an edge portion extracting device 70 that extracts the edge portion and a image processing block 72 which optionally performs various kinds of image processing operations such as sharpness enhancement, grain suppression, conversion of density dynamic range of the image data or the like.

In the image processing subsection 54, the color density and gradation converting device 64 converts the image data into density data, color data and gradation data in accordance with LUTs and the like. The saturation converting device 66 converts the saturation data of the image data obtained by the color density and gradation converting device 64 in accordance with MTX operations and the like. The electronic magnification converting device 68 increases or decreases pixel data number of the image data by interpolating or thinning out the image data that has been converted saturationwise by the saturation converting device 66 in accordance with the size of the color image to be outputted on color paper at the image recording apparatus 16 and also in compliance with pixel density to be outputted. The edge portion extracting device 70 decides whether the pixel of interest is an edge portion or a grain portion thereby extracting the edge portion. The image data that has been subjected to the edge portion extraction is sent to the image processing block 72 where the thus extracted edge portion is subjected to various kinds of image processing operations such as sharpness enhancement, grain suppression of the grain portion and the like. It is a matter of course that this image processing block 72 may adopt an image processing method of a fifth embodiment of the invention which will be described later whereupon sharpness enhancement processing and grain suppression processing may be performed by correction amounts corresponding to respective separated regions on the basis of information on the edge portion extracted by the edge portion extraction device 70 and the flat portion (grainy portion) which does not include the edge portion. Namely, this image processing block 72 may comprise granularity correcting and sharpness correcting unit 220 of an image processing apparatus 16 shown in FIG. 15 which constitutes the image processing apparatus of a third and a fourth embodiments of the prevent invention that will be described later.

Figure 5:
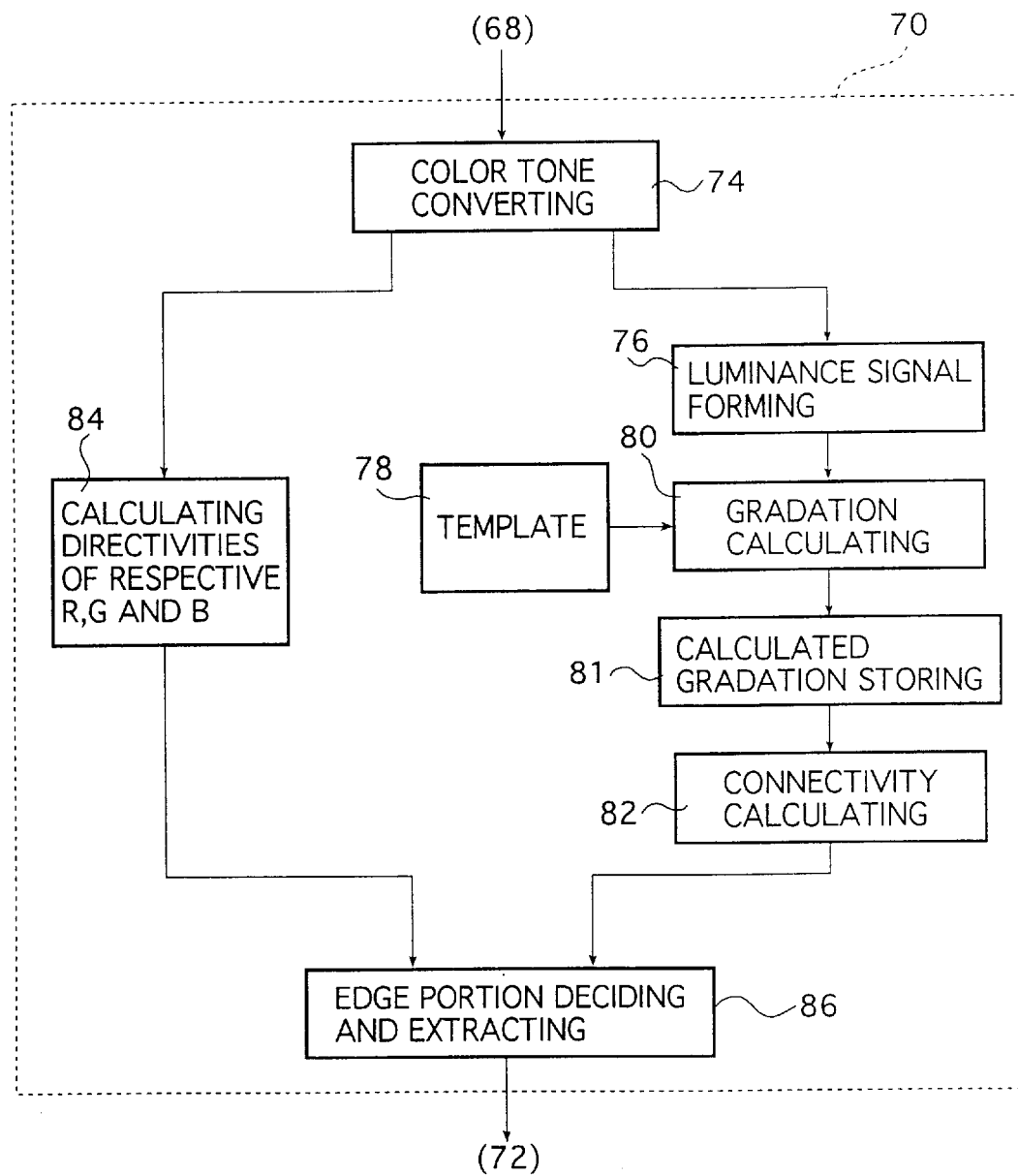
FIG. 5 is a block diagram schematically showing an edge portion extraction means shown in FIG. 4.
Figure 6A:
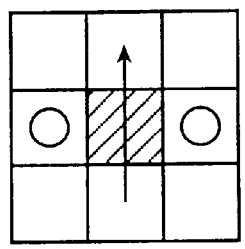
FIGS. 6 to 6D are illustrations each showing a pixel of interest and its adjacent pixels.
Figure 6B:
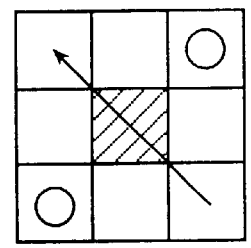
Figure 6C:
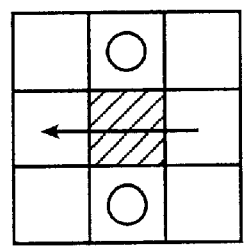
Figure 6D:
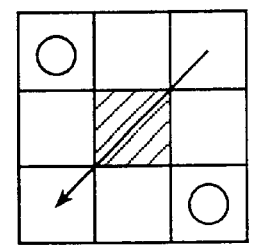

FIG. 5 is a block diagram schematically showing an embodiment of the edge portion extracting device 70.

As shown in FIG. 5, the edge portion extracting device 70 comprises color-tone converting device 74, a luminance signal forming device 76, a template 78 for calculating a gradient, a gradient calculating device 80, a thus calculated gradient storing device 81, a connectivity calculating device 82 for the pixel of interest and the like, a directivity calculating device 84 for respective R, G and B and an edge portion deciding and extracting device 86.

The color tone converting device 74 converts the color tone signal level of the image data into an original image signal. The luminance signal forming device 76 that converts R, G and B color signals of the original image signal which have been converted of their color tones with the color tone converting device 74 into luminance signals whereupon the R, G and B color signals are weighted in accordance with sensitivity of human eyes to produce luminance signals Y. An exemplary conversion equation is as follows:

$$Y = 0.3R + 0.59G + 0.11B$$

The template 78 is used for obtaining a gradient (inclination, namely, corresponding to differential) representing each of directions and intensities of the pixel of interest and its surrounding pixels is not limited in any particular way and it may be, for example, in the case of a template comprising a 3×3 matrix, a 'Sobel' operator as shown in FIG. 10. Other examples include a 'Prewitt' operator and a 'Kirsch' operator which are each used for calculating the magnitude and the direction of density inclination of the pixel of interest. The matrix which constructs the template used in the invention and which complies with such operators as above is not limited to the above 3×3 shown in each of FIG. 10 and it may be of any size and of any form as appropriate. As the matrix of the template of the invention, a square matrix such as 5×5, 7×7, 9×9 or the like, or a non-square matrix such as 3×5, 3×7, 5×9 or the like can be employed.

The gradient calculating device 80 calculates gradients of the pixel of interest and its surrounding pixels as described above using the template 78 with reference to the image data that has been converted into the luminance signal with the luminance signal forming device 76. Take, for example, a case of image data of 3×3 pixels with the pixel of interest in center where sums of products are calculated using eight kinds of 3×3 templates showing eight different directions from each other as shown in FIG. 10 to calculate the gradient of the pixel of interest in which the thus obtained sum of the products and the direction represented by the template showing that the sum of the products is the maximum value are treated as the intensity and the direction of the gradient of the pixel of interest. In the same way as such, gradients of its surrounding pixels are also calculated. Subsequently, the gradient storing device 81 stores the gradients of the pixel of interest and its surrounding pixels calculated by the gradient calculating device 80.

The connectivity calculating device 82 calculates the connectivity of the pixel of interest from the stored gradients of the pixel of interest and its surrounding pixels. Namely, the connectivity calculating device 82 compares the direction of the gradient of the pixel of interest and those of the gradients of its surrounding pixels, decides the presence or the absence of the connectivity based on connectivity deciding conditions and then calculates the connectivity. Specifically, it is decided that the connectivity exists if the directions of the gradients of the specified number of pixels among these nearby pixels comply with specified conditions. These specified conditions of the connectivity will be described later in this specification.

The directivity calculating device 84 for respective R, G and B calculates gradients of respective R, G and B of each pixel of interest using templates 78 in each of R, G and B thereby calculating the directivities of respective R, G and B of each pixel of interest.

The edge portion deciding and extracting device 86 makes a decision from the connectivity of the pixel of interest calculated by the connectivity calculating device 82 and the directivities calculated by the directivity calculating device 84 for respective R, G and B as to whether the pixel of interest is an edge portion or a non-edge portion, that is, a grain portion, thereby extracting the edge portion. The image data subjected to the decision and the edge portion extraction is sent to the image processing block 72 where image processing operations (frequency processing) such as sharpness enhancement, grain suppression processing or the like are performed. The sharpness enhancement or the grain suppression processing that are performed in the image processing block 72 may be the known sharpness enhancement or the known grain suppression processing as described above and may also be sharpness enhancement or grain suppression processing of the invention that will be described later.

The image processing apparatus of the invention and the digital photoprinter employing that image processing apparatus of the invention are basically composed as described above. Operations of the image processing apparatus of the invention and of the digital photoprinter, as well as the image processing method of the invention, will now be described.

The operator loads the scanner 12 with the carrier 28 that is associated with the film F (frame to be read), sets the film F in a specified position on the carrier 28, enters the necessary commands such as finishing information, the print size to be prepared and the like, and thereafter keys in a command for starting print preparation.

In response to the above arrangements, the stop-down value of the variable diaphragm 24 in the scanner 12 and the storage time of the image sensor 32 (line CCD sensors of 32R, 32G and 32B) are set in accordance with the reading conditions for prescan; thereafter, the carrier 28 transports the film F in the auxiliary scanning direction at a specified speed to start prescan; the film F is subjected to slit scan; the projected light is focused on the image sensor 32 so that the image recorded on the film F is photoelectrically captured in low resolution as R, G and B separations.

In this case under discussion, prescan and fine scan may be performed frame by frame. Alternatively, all frames may successively be subjected to prescan and fine scan. If desired, prescan and fine scan may continuously be performed on frame groups each consisting of a given number of frames. On the pages that follow, a case of reading the image in one frame is described for the sake of simplicity.

The output signals produced from the image sensor 32 by prescan are amplified by Amp 33 and sent to the A/D converter 34, where they are converted to the digital image data and outputted to the image processing apparatus 14 of the invention. The digital image data that is inputted in the image processing apparatus 14 is subjected to specified corrections such as dark current correction and the like of the image sensor 32 at the scanner correction section 36 and thereafter the corrected digital image data is sent to the LOG converter 38 where the corrected digital image data is converted into prescanned image data using an LUT within a density range adapted to prescan, for example, so as to allot the density range of 4 in the scale of the density D to the data in 10 bits. The obtained prescanned image data is stored in the prescan memory 40.

The setup subsection 58 in the condition setting section 48 reads out the stored prescanned image data out of the prescan memory 40, constructs density histograms, calculates image characteristic quantities such as highlights, shadows and the like, performs any other necessary operations, sets the reading conditions for fine scan which are then supplied to the scanner 12 and sets various kinds of image processing conditions such as gradation adjustment, gray balance adjustment and the like which are then supplied to the parameter coordinating subsection 62.

The parameter coordinating subsection 62 that received the image processing conditions sets them at specified sites (hardware and software) of the prescanned data processing section 44 and the fine scanned data processing section 46.

If verification is to be performed, the prescanned data processing section 44 reads out the prescanned image data from the prescan memory 40, processes it imagewise in the image processing subsection 50 with the specified processing conditions and subsequently converts the processed data to a suitable form in the image data converting subsection 52. The converted data is represented as a simulated image on the monitor 20.

Looking at the representation on the monitor 20, the operator verifies (checks) the image, or the result of the processing and, if necessary, manipulates the aforementioned keys arranged on the keyboard 18a to adjust the color, density, gradation and other features of the image.

The inputs for this adjustment are sent to the key correcting subsection 60 which, in response to the entered inputs for adjustment, calculates the amounts of correction of the image processing conditions and sends them to the parameter coordinating subsection 62. In response to the supplied amounts of correction, the parameter coordinating subsection 62 corrects the LUTs, MTXs and other conditions in the image processing subsections 50 and 54. Therefore, the image represented on the monitor 20 also varies in response to this corrective measure, or the inputs for adjustment entered by the operator.

If the operator concludes that the image in the frame of interest represented on the monitor is appropriate (verification OK), the operator manipulates the keyboard 18a or the like to give a command to start printing, whereupon the image processing conditions are finalized and set in the scanner 12 in accordance with the reading conditions for fine scan including the stop-down value of the variable diaphragm 24 and, at the same time, the carrier 28 transports the film F at a suitable speed, whereby fine scan gets started.

If no image verification is to be performed, the image processing conditions are finalized at the point of time when the parameter coordinating subsection 62 ends setting of the image processing conditions in the processing subsection 54 of the fine scanned data processing section 46, and fine scan gets started.

Fine scan is performed in essentially the same manner as prescan except that the reading conditions such as the stop-down value of the variable diaphragm 24 are different from those for prescan; the output signals from the image sensor 32 are amplified with Amp 33, converted to digital density data in the A/D converter 34 in the processing apparatus 14, subjected to the specified processing in the scanner correction section 36 and sent to the LOG converter 38.

In the LOG converter 38, the fine scanned digital image data is processed with a higher density resolution than that for prescan, for example, as is converted with a LUT so as to allot the density range of 2 in the scale of the density D to the data in 10 bits, thereby forming the fine scanned image data that is then sent to the fine scan memory 42.

In the image processing subsection 54, density data, color data and gradation data of the fine scanned image data are converted by the color density and gradation converting device 64 in accordance with a look-up table and, moreover, the saturation data of the image signals is converted by the saturation converting device 66 in accordance with the matrix operations. The number of pixel data of the image data signals are then increased or decreased by the electronic magnification converting device 68 in accordance with the color image size to be outputted on color paper. Thereafter, the image signals are inputted into the edge extracting device 70.

The original image signals subjected to color conversion by the color tone converting device 74 are converted into the luminance signals Y by the luminance signal forming device 76 and are then inputted into the gradient calculating device 80, where gradients corresponding to vector values representing magnitude and directions of density inclinations of the pixel of interest and of its surrounding pixels are calculated using templates 78.

Figures 11A, 11B, 12:
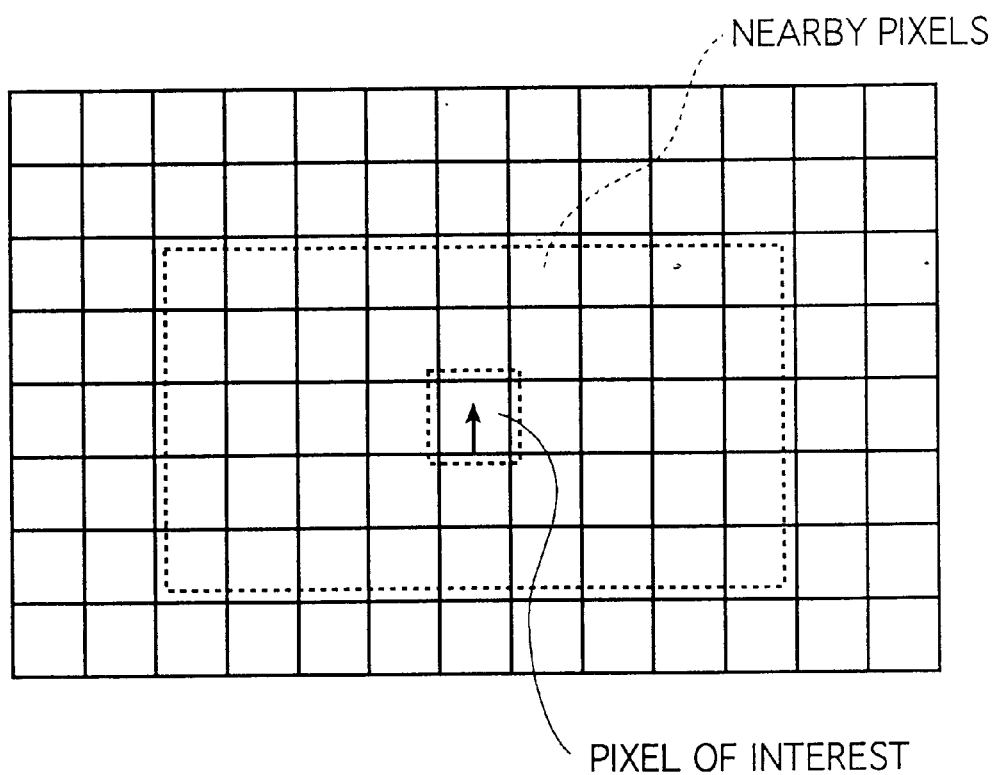
FIG. 11A is an illustration showing an example of an image with a 3×3 matrix composed of a pixel of interest and its surrounding pixels.
FIG. 11B is an illustration showing a direction of gradient of the pixel of interest in FIG. 1A.
FIG. 12 is an illustration showing an example of the nearby pixels to be selected for decision of connectivity relative to the pixel of interest in the invention.

For example, the aforementioned operation of sum of products is performed in the same manner as described above on image data having a 3×3 matrix comprising the pixel of interest and the surrounding pixels as shown in FIG. 11A using 3×3 templates as shown in FIG. 10, and from a maximum sum of the products and a template corresponding to the maximum sum of the products a gradient of the pixel of interest that has the intensity corresponding to the maximum sum of the products and the direction shown by the template corresponding to maximum sum of the products is calculated. Then, two adjacent pixels that are placed on the opposite side of the pixel of interest in the direction of 90 degrees apart from (perpendicular to) the direction of the gradient of the pixel of interest are selected from among the surrounding pixels as nearby pixels for deciding the presence or the absence of the connectivity whereupon 3×3-matrix images with each of two adjacent pixels in center are defined to calculate the gradients of those adjacent pixels in the same manner as described above. In this case, if the direction of the gradient of the pixel of interest coincides with the direction of the arrow shown in FIG. 6, the ones marked with 'O' become the adjacent pixels. Consider, for example, a case where the direction of the gradient of the pixel of interest in a 3×3 image data coincides with the direction of the arrow shown in FIG. 11B, then the pixel value 1 in the upper left in the figure and the pixel value 5 in the lower right in the figure come to be the adjacent pixels.

The gradient calculating device 80 calculates gradients of respective adjacent pixels, thereby obtaining their directions. Thereafter, the thus obtained gradients of the pixel of interest and of its surrounding pixels are stored in the gradient storing device 81.

The connectivity calculating device 82 decides the connectivity of the pixel of interest from the directions of the stored gradients of the pixel of interest and its surrounding pixels.

If the directions of gradients of two adjacent pixels are within 45 degrees from the direction of the gradient of the pixel of interest, the pixel of interest is decided as having connectivity.

Figure 7A:
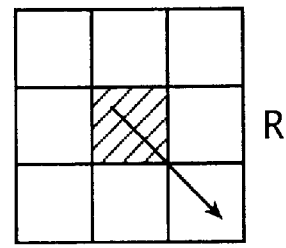
FIGS. 7A to 7C are illustrations each showing decision of directivities of respective R, G and B in an embodiment of the invention.
Figure 7B:
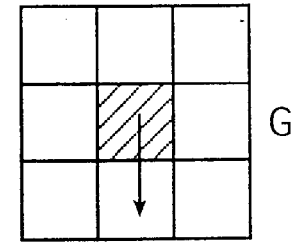
Figure 7C:
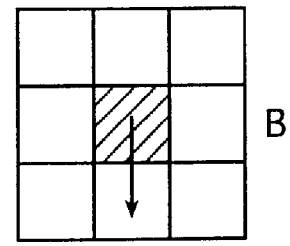

On the other hand, the directivity calculating device 84 for respective R, G and B (hereinafter called as directivity calculating means) calculates gradients of the image data of respective R, G and B of the same pixel of interest using templates 78 in the same manner as above, thereby calculating directivities of respective R, G and B as shown in FIG. 7.

The edge portion deciding and extracting device 86 decides the edge portion based on the connectivity of the pixel of interest and directivities of respective R, G and B that were calculated by the connectivity calculating device 82 and the directivity calculating device 84 and then extracts it. When the pixel of interest has the connectivity and also the directivities of respective R, G and B are within 45 degrees, the pixel of interest is decided as the edge portion whereupon the pixel of interest is kept remained as the edge portion. Unless otherwise, the pixel of interest is removed. That the directivities of respective R, G and B are within 45 degrees from each other means that, if G is taken as the channel of interest, the directions of R and B are each within 45 degrees from the direction of G as shown in FIG. 7.

With reference to the pixel of interest that has thus been decided as the edge portion, the direction and magnitude of the gradient obtained by the gradient calculating device 80 are called as the direction and the intensity of the edge respectively. The intensity of the edge represents the inclination of the edge so that the edge with large intensity can be said as a clear edge with large inclination. Therefore, this inclination can be utilized for controlling the degree of sharpness enhancement and of grain suppression of the image, that is, the gains that determine the intensity when sharpness enhancement and grain suppression operations are performed. Take, for example, a case where in the edge portion the gain of the high-frequency component of the image data is increased in accordance with the intensity of the gradient thereby enhancing the sharpness of the image, while in the flat portion or the part that does not include the edge portion the gain of the middle-frequency component of the image data is lowered in accordance with the intensity of the gradient thereby suppressing graininess or the like caused by grains of the image.

Moreover, it is arranged that the pixel of interest that has not been decided as the edge portion has the gradient of 0.

The image data subjected to decision and extraction of the edge portion is sent to the image processing block 72 where sharpness enhancement, grain suppression and any other necessary image processing operations are performed. Thereafter, the image data subjected to the above image processing is inputted into the image data converting subsection 56 where the processed image data is converted into the image data for output image which is subsequently outputted from the image processing apparatus 14 into the image recording apparatus 16.

The image recording apparatus 16 comprises a printer (exposing device) that records a latent image on a light-sensitive material (photographic paper) by exposing it in accordance with the supplied image data and a processor (developing device) that performs specified processing steps on the exposed light-sensitive material, thereby outputting the exposed and processed light-sensitive material as a print.

To give one example of the printer's operation, the light-sensitive material is cut to a specified length in accordance with the finished print; thereafter, the printer records a back print and three light beams for exposure to red (R), green (G) and blue (B) in accordance with the spectral sensitivity characteristics of the light-sensitive material are modulated in accordance with the image data outputted from the processing apparatus 14; the three modulated light beams are deflected in the main scanning direction while, at the same time, the light-sensitive material is transported in the auxiliary scanning direction perpendicular to the main scanning direction so as to record a latent image by two-dimensional scan exposure with said light beams. The light-sensitive material bearing the latent image thus obtained is then supplied to the processor. Receiving the light-sensitive material bearing a formed latent image, the processor performs a wet development process comprising color development, bleach-fixing and rinsing; the thus processed light-sensitive material is dried to produce a finished print; a plurality of prints thus produced are sorted and stacked in specified units, say, one roll of film.

Operations of the image processing apparatus of the invention and of the digital photoprinter, as well as the image processing method of the invention, have been basically described. Now the image processing method of the invention will particularly be described with reference to FIG. 8.

FIG. 8 is the flowchart showing respective processing operations of the image processing method of the invention which are to be performed in the aforementioned edge portion extracting device 70.

As shown in FIG. 8, at step 1 the direction and intensity of the gradient of the pixel of interest are calculated. At step 2, gradients of two adjacent pixels in the direction of 90 degrees from the direction of the gradient of the pixel of interest are calculated whereby their directivities are checked. At step 3, directions of two adjacent pixels and the pixel of interest are compared. If each of the former ones has the directivities within 45 degrees from the direction of the pixel of interest, it is treated that each of them has connectivity. At step 4, gradients of the pixel of interest corresponding to respective R, G and B channels are calculated whereby their directivities are checked. At the last step, that is, step 5, based on the obtained connectivity and the directivities of respective R, G and B, the pixel of interest is decided whether it is the edge portion or not.

In the above embodiment, following case has been described as a representative exemplary illustration: eight kinds of 3×3 templates that show eight different directions from each other as shown in FIG. 10 are employed with reference to the image data with 3×3 pixels made up of the pixel of interest in center and eight surrounding pixels existing around the pixel of interest; two adjacent pixels placed on the opposite sides of the pixel of interest and in the direction of 90 degrees apart from the direction of the gradient of the pixel of interest are selected from among those surrounding pixels as the nearby pixels to be used for deciding the presence or the absence of the connectivity; as the deciding condition on connectivity, that is, the condition required for determining the presence of the connectivity, the directions of the gradients of the thus selected two adjacent pixels on the opposite sides of the pixel of interest are each within 45 degrees from the direction of the pixel of interest; and as the deciding condition on edge portion, that is, the condition required for determining that they are the edge portion, the connectivity must exist, as well as the directivities of respective R, G and B are within 45 degrees from each other. The invention is by no means limited to the above described case and the pixel of interest, surrounding pixels and nearby pixels for decision of the presence or the absence of the connectivity may be appropriately selected. As far as the pixel of interest and the surrounding pixels properly correspond to templates, any templates may be employed. As far as the edge portion can be decided, deciding conditions of connectivity and the edge portion may be set in any manner.

Consider, for example, a case where, with reference to the pixel of interest to be employed in the invention and its surrounding pixels, the size and the form are not specifically limited in any particular way and pixels arranged in square-patterns including 3×3, 5×5, 7×7, 9×9 and the like, pixels arranged in rectangular patterns including 3×5, 3×7, 5×9 and the like and pixels in other arrangements may be optionally employed. The surrounding pixels may be not only eight pixels surrounding the pixel of interest, but also 14 pixels, 20 pixels, 24 pixels or more pixels in a wider area. The templates to be employed in the invention are not particularly limited in their sizes, forms and numbers and, besides a template with a square matrix of 3×3, templates with square matrices including those of 5×5, 7×7, 9×9 and the like, templates with rectangular matrices including those of 3×5, 3×7, 5×9 and the like, and templates with other forms of matrix may be employed. The number of templates are not limited to eight showing eight different directions from each other and may be either more than eight or less than eight.

The nearby pixels for deciding the presence or the absence of connectivity are not limited in their sizes and forms and two adjacent pixels on the opposite sides perpendicular to the direction of the gradient of the pixel of interest, as well as several nearby pixels, may be selected to be examined. In such case, for example, the above-mentioned pixels in square, rectangular or optional form around the pixel of interest placed in center excluding the pixel of interest may be selected. However, pixels are preferably selected from among 1×3 pixels, 1×5 pixels, 3×5 pixels and 3×7 pixels where the pixel of interest is placed in center and more pixels are arranged in the direction perpendicular to the direction of (the gradient of) the pixel of interest than in other directions excluding the pixel of interest or from among rectangular pixels such as 5×9 pixels as shown in FIG. 12 and the like excluding the pixel of interest placed in center. This is because the edge of the image has a certain length so that it is appropriate to define more pixels in the direction along its length direction, that is, perpendicular to the direction of the pixel of interest than in other directions for examining connectivity.

In the invention, it is the condition (deciding condition for connectivity) for determining the presence of the connectivity that, when the direction of the gradient of the pixel of interest and the direction of the gradient of the nearby pixels of the pixel of interest are compared, directions of the specified number of pixels among the nearby pixels agree with the specified condition. However, in this case, 50% or more of the directions of the nearby pixels are preferably within 45 degrees from the direction of the pixel of interest. Namely, the rate of the specified number of nearby pixels the directions of which agrees with the direction of the pixel of interest under the specified condition against the nearby pixels selected for deciding connectivity is preferably at least 50%, more preferably 70% or more, furthermore preferably 80% or more and most preferably 90% or more. It may of course be 100%. These numbers are changeable according to various conditions as described later. The specified condition of the directivities of the nearby pixels is that the direction is preferably within 45 degree, more preferably within 30 degrees. It may of course be 0 degrees (complete matching) or within any specified degrees between 0 degrees and 45 degrees, but it is preferable that a certain range of degrees is given so as to prevent the extraction failure of connectivity for the sake of increasing the decision accuracy. From the above consideration, the specified condition is preferably to be within 45 degrees or within 30 degrees, though the specified condition is changeable depending on various conditions described later.

It should be noted that it is one of the extremely preferable deciding conditions for connectivity that all directions of the gradients of the nearby pixels for deciding connectivity of two adjacent pixels and the like in opposite sides of the pixel of interest are within 45 degrees.

The condition of directivity of each R, G and B that is one of deciding conditions of the edge portion that it is determined as an edge portion may be within any specified degrees between 0 degree and 45 degrees as completely same as the specified condition of direction of nearby pixels for deciding the connectivity as described above. However, the directivity of within 45 degrees in the above embodiment is preferable; the directivity of within 30 degrees is more preferable. The condition of the directivity is changeable depending on the various conditions to be described later.

The specified condition of directivities of the nearby pixels for deciding connectivity and the condition of directivity of each R, G and B for deciding the edge portion are the same as both being within 45 degrees with each other in the above embodiment, but they may be different from each other.

As described above, the size (form) and number of templates, selection method of nearby pixels, the deciding condition of connectivity, that is, the specified condition of directivity of the nearby pixels, the rate of pixels that satisfy the specified condition of the directivity to the nearby pixels and the condition of the directivity of each R, G and B are changeable in various ways according to items such as original kinds (a high sensitive negative film, a low sensitive negative film, a reversal film, a reflected original, images recorded by a digital camera and the like), original sizes (240 (APS), 110, 135, 120, 220 (brownie) and the like), print magnifications, print sizes, camera kinds and exposure conditions (under- or over-exposures) at the time of shooting and are preferably determined in accordance with at least one of the above-mentioned items. It should be noted that the way of determining above-described various conditions in accordance with at least one of these items is of course not limited to this way of determination.

The print magnification and original kinds, for example, among items described above, give a great influence to selection method of the nearby pixels, conditions such as the deciding condition for connectivity, the condition of the directivity of each R, G and B and the like. When the print magnification changes, it is preferable that selection method of the nearby pixels is changed with these conditions kept unchanged, whereas, when an original kind, for example, film sensitivity, is changed, it is preferable that these conditions are changed, namely, the conditions are brought severer in the case of the high sensitive film than in the case of the low sensitive film with the selection method kept unchanged. Moreover, when the exposure condition is under-exposure at the time of shooting, it is preferable that these conditions are basically brought milder with the selection method of the nearby pixels kept unchanged.

FIG. 9 shows comparisons of effects between the embodiment of the invention and the prior art.

Figure 9A:
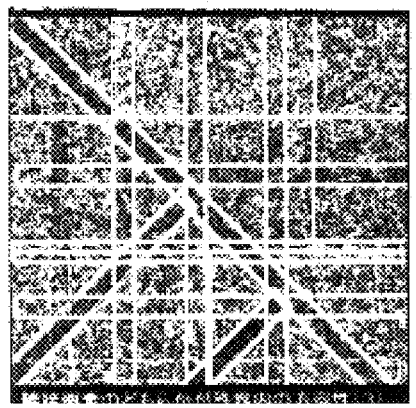
FIG. 9A shows an embodiment in the prior art and FIGS. 9B to 9E show the embodiments of the invention.

FIG. 9A shows an example of the prior art where decision of directivities of respective R, G and B are not made and one of the adjacent pixels is decided to be within an allowable range (within 45 degrees). In addition to white lines that show original edge portion, a number of white dots representing the grain portion remain.

Figure 9B:
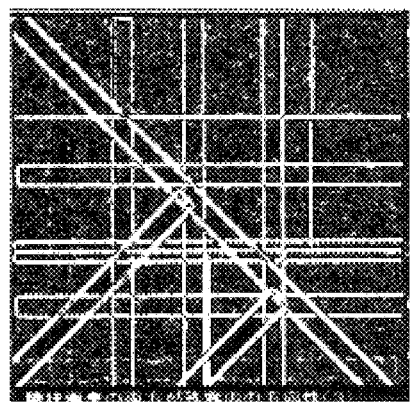
Figure 9C:
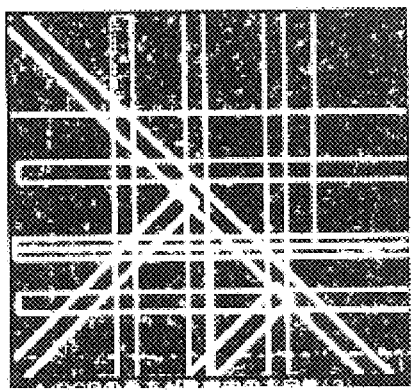

On the other hand, FIG. 9B shows a case where each of the adjacent pixels is within an allowable range (within 45 degrees), though not paying attention to the directivities of respective R, G and B. In this case, the edge portion is decided more accurately with grains being substantially decreased. FIG. 9C shows a case where, though the adjacent pixels are same as those of the prior art with one of the adjacent pixels being arranged to be within an allowable range and, moreover, decision of directivities of respective R, G and B can be made. In this case, two channels except the channel of interest have directivities within the allowable range. In this case, grains are substantially removed.

Figure 9D:
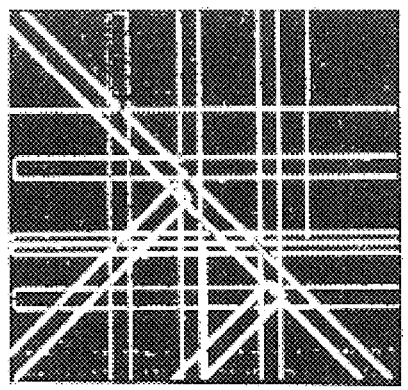

FIG. 9D shows a case where the cases of FIGS. 9B and 9C of the embodiments of the invention are combined. Namely, the adjacent pixels are arranged to be within the allowable range and, moreover, directivities of respective R, G and B (other channels than the channel of interest are within the allowable range) are taken into consideration. In this case, the edge portion is decided more accurately with grains scarcely remaining.

Figure 9E:
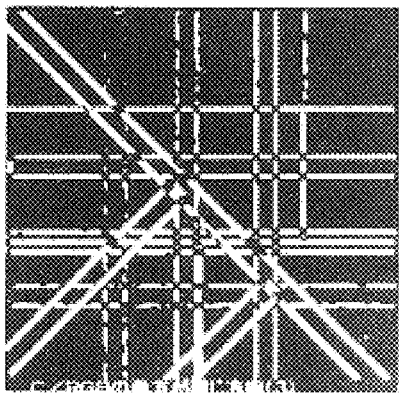

FIG. 9E shows a case where the adjacent pixels have the same direction and, moreover, concerning R, G and B, other channels than the channel of interest have the same direction. This case has effects as close as those of the case of FIG. 9D.

According to the embodiments of the invention, both adjacent pixels are arranged to be within the allowable range and, moreover, directivities of respective R, G and B are taken into consideration so that the edge portion can be extracted more accurately than in the prior art.

As described above, according to the first and second embodiments of the invention, the edge portion can be extracted more accurately than in the prior art thereby being capable of producing output image of high quality.

Next, the image processing apparatus of a second and a third embodiments of the invention, as well as the image processing method of a fifth embodiment of the invention, will be described with reference to FIGS. 13 to 25.

Figure 13:
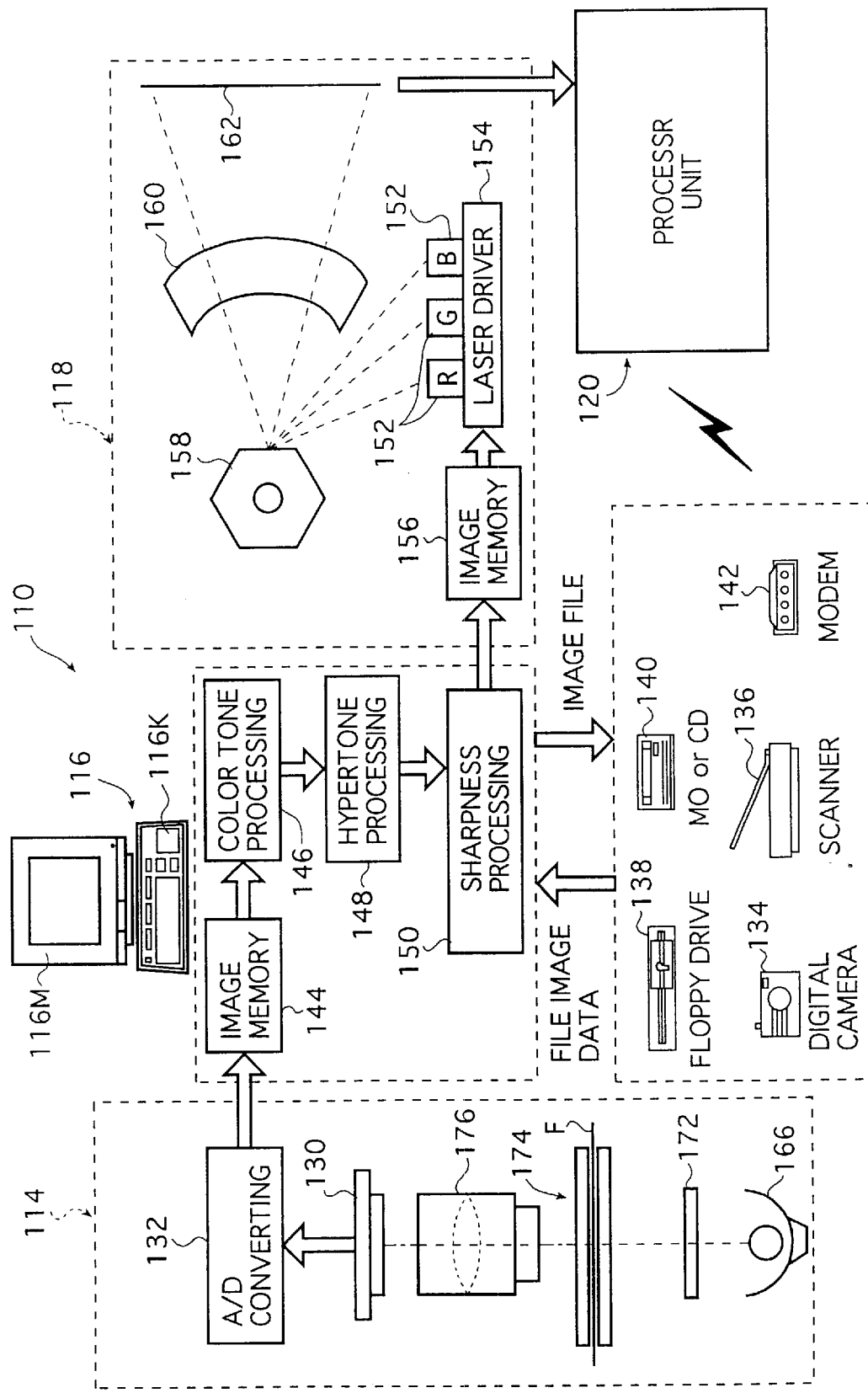
FIG. 13 is an illustration schematically showing an embodiment of a digital lab system that utilizes the image processing apparatus of the invention.

FIG. 13 is a block diagram showing an embodiment of a digital lab system that is applied with the image processing apparatus of the third and fourth embodiments of the invention performing the image processing method of the fifth embodiment of the invention.

Figure 14:
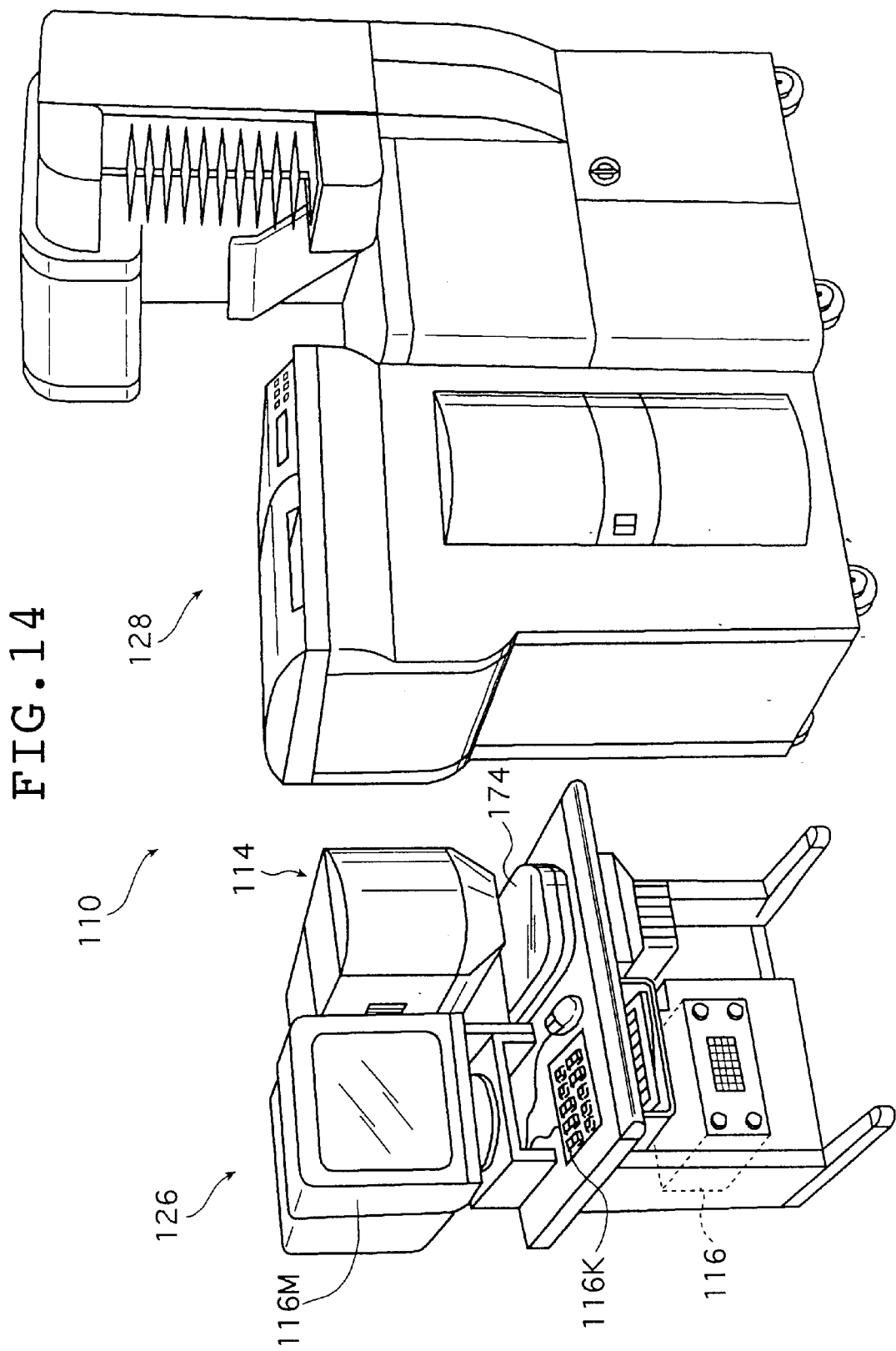
FIG. 14 is a schematic perspective diagram showing the digital lab system shown in FIG. 13.

FIGS. 13 and 14 show a schematic construction of the digital lab system 110 according to the invention.

As shown in FIG. 13, the digital lab system 110 comprises a line CCD scanner 114, an image processing unit 116, a laser printer unit 118 and a processor unit 120 whereby the line CCD scanner 114 and the image processing unit 116 are combined to be an input unit 126 as shown in FIG. 14, while the laser printer unit 118 and the processor unit 120 are combined to be an output unit 128.

The line CCD scanner 114 is to read an image in a frame recorded in a photographic film such as a negative film, a reversal film or the like. More in detail, images in frames recorded in the photographic films in 135 and 110 sizes, the photographic film where a transparent magnetic layer is formed (the photographic film in 240 size, namely, APS film; Advanced Photo System) and in the photographic films in 120 size and 220 (brownie) size are targeted for being read. The line CCD scanner 114 reads the image in a frame as a target for being read with a line CCD 130 and then converts the thus read image with an A/D converting section 132 into image data for being thereafter outputted into the image processing unit 116.

In an embodiment of the invention, for the sake of simplicity purpose only, the digital lab system 110 employing the photographic film in 240 size (APS film) is described.

The image processing unit 116 is constructed in a manner that it can be inputted from outside with, such as image data outputted from the line CCD scanner 114 (scanned image data), image data obtained by photographing (recording) with a digital camera 134 and the like, image data obtained by reading an original (for example, a reflected original and the like) with the scanner 136 (flat bed type) for the reflection original, image data formed by another computer and then recorded in a floppy disc drive 138, an MO drive or a CD drive 140, communication image data received by way of a modem 142 and the like (hereinafter the above described data are as a whole called as file image data).

The image processing unit 116 stores the inputted image data in an image memory 144, subjects the thus stored image data to various image processing operations including corrections and the like in a color tone processing section 146, a hypertone processing section 148, a hypersharpness processing section 150 and the like and then outputs the thus processed image data to the laser printer unit 118 as image data for recording. The image processing unit 116 can also output the processed image data outside the apparatus as an image file (for example, outputting the data into storing media such as an FD, an MO, a CD and the like, transmitting the data into other information processing apparatus by way of communication channels and the like).

The laser printer unit 118 that comprises a laser beam source 152 composed of R, G and B and, while controlling a laser driver 154, exposes a photographic paper to the laser beam modulated in accordance with the image data for recording (after once stored in the image memory 156) inputted from the image processing unit 116, thereby recording an image on the photographic paper 162 by scan exposing (in the case of an embodiment of the invention, optical system employing mainly a polygon miller 158 and an fθ lens 160). The processor unit 120 subjects the photographic paper 162 recorded with the image by the scan exposing in the laser printer unit 118 to each processing operation of color development, bleach-fixing, rinsing and drying to produce the image on the photographic paper.

Construction of Line CCD Scanner:

Now construction of the line CCD scanner 114 is described.

The construction of the optical system of the line CCD scanner 114 is schematically shown in FIG. 13. The optical system comprises a light source 166 for irradiating a photographic film F with a light. A light diffusion plate 172 for diffusing the light that irradiates the photographic film F is arranged in a light emitting side of the light source 166.

The photographic film F is transported in such a manner that the surface of the image in a frame is perpendicular to a light axis by a film carrier 174 provided in the side where the light diffusion plate 172 is arranged.

A lens unit 176 that focuses the light transmitted through the image in a frame and the line CCD 130 are arranged in this order in the opposite side of the photographic film F against the light source 166 along the light axis. For a concise purpose, a single lens is shown as the lens unit 176 in FIG. 13. However, the lens unit 176 is a zoom lens composed of a plurality of lenses in an actual application. A SELFOC lens may be employed as the lens unit 176. In this case, both end surfaces of the SELFOC lens are preferably located as close to the photographic film F and the line CCD 130 as possible.

In the line CCD 130, a plurality of CCD cells are arranged in a line along the width direction of the photographic film F which is perpendicular to the direction in which the photographic film F is transported; sensing sections provided with an electronic shutter are arranged in three lines in parallel and spaced apart from each other; light incident sides of the sensing sections are provided with respective R, G and B color separating filters (so-called three line color CCD). The line CCD 130 is arranged in a manner that the light-receiving surface of each sensing section is in registry with an imaging point of the lens unit 176.

Though not shown in FIG. 13, a shutter is provided between the line CCD 130 and the lens unit 176.

Construction of Control System of the Image processing unit 116:

Now construction of a control system of the image processing unit 116 is described.

Figure 15:
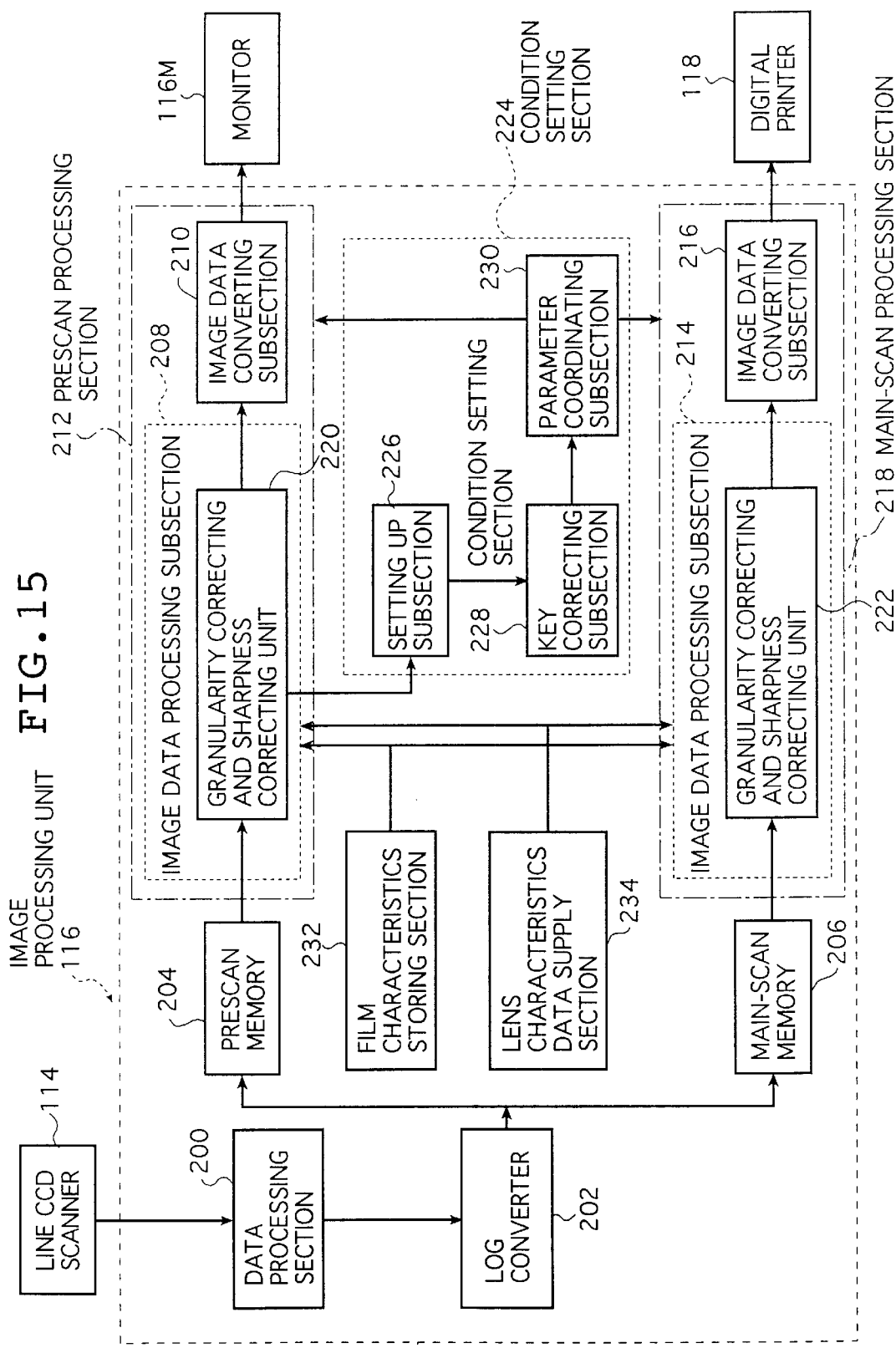
FIG. 15 is a control block diagram showing an embodiment of the image processing unit of the digital lab system shown in FIG. 13.

FIG. 15 shows a control block diagram in detail for performing processing operations of main constituents of the image processing unit 116 shown in FIG. 13: image memory 144, color tone processing section 146, hypertone processing section 148 and hypersharpness processing section 150.

Digital signals of respective R, G and B outputted from the line CCD scanner 114 are subjected to specified image processing operations such as dark time corrections, defect pixel corrections, shading corrections and the like in a data processing section 200 and then converted into digital image data (density data) in a log converter 202. Prescanned data of the digital image data is stored in a prescan memory 204, while its main-scanned data is stored in a main-scan memory 206.

The prescanned data stored in the prescan memory 204 is sent to a prescan processing section 212 composed of an image data processing subsection 208 and an image data converting subsection 210. On the other hand, main-scanned data stored in the main-scan memory 206 is sent to a main-scan processing section 218 composed of an image data processing subsection 214 and an image converting subsection 216

In these prescan processing section 212 and main-scan processing section 218, corrections are performed on the basis of lens characteristics applied when the image is recorded and light emission characteristics of the electronic flash, if any, when pictures are taken.

In the image data processing subsections 208 and 214 are connected to a film characteristic storing section 232 that stores film characteristics of various films and a lens characteristic data supplying section 234 that obtains information for deciding a kind of camera that uses the film and thereafter outputs lens characteristics corresponding to the kind of camera that takes a picture.

Film characteristics refer to gradation characteristics (γ characteristics) and is generally shown as a curve where density changes three-dimentionally according to exposure light quantities. This is a well-known technique so that further explanation is not made here.

According to an embodiment of the invention, information on the film kind is recorded on a magnetic recording layer of the APS film so that the film kind can be identified by reading the information with a magnetic head as the film is transported by the carrier 174 of the line CCD scanner 114. In the case of a 135-sized film, the film kind may be decided from its form (perforations being provided in both ends of the film in the width direction with relatively short intervals from each other) and the like, or may be entered from keys by an operator. By identifying the film kind, an image density relative to the film base density can be accurately calculated.

In the image data processing subsections 208 and 214, reference values are corrected in accordance with the film kind and the camera kind that are obtained from the film characteristic storing section 232 and the lens characteristic data supplying section 234 and, moreover, parameters for color balance adjustments, contrast adjustments (color tone processing), lightness adjustments, saturation adjustments (hypertone processing) and like are obtained by utilizing known methods such as LUTs, matrix (MTX) operations and the like.

Furthermore, the image data processing subsections 208 and 214 comprise granularity correcting and sharpness correcting unit 220 (granularity correction amount calculating means and granularity correcting means) respectively that each perform following steps in each of the plurality of the unit regions 240 on the basis of the density of each of the plurality of the unit regions (specified regions) 240 which have been formed by dividing the imaged data in one frame: calculating granularity correcting amounts; obtaining degrees of sharpness enhancement; and executing the granularity corrections and the sharpness enhancement degree corrections according to the calculated granularity correction amounts. Thus, correction amounts for performing granularity by means of the processing described below are calculated in the granularity correcting and sharpness correcting unit 220.

The granularity correcting and sharpness correcting unit 220 comprising sharpness enhancement degree correction amount calculating means and sharpness enhancement degree correcting means of the invention may perform on the basis of density of each of the plurality of the unit regions (specified regions) 240 the steps of: calculating the sharpness enhancement degree correction amount of each of the unit regions 240; and correcting the degree of the sharpness enhancement on the basis of the obtained sharpness enhancement degree correction amount.

The granularity correcting and sharpness correcting unit 220 may perform the granularity correction amount calculation and the granularity correction and/or the sharpness enhancement degree correction amount calculation and the sharpness enhancement degree correction.

In the invention, The granularity correcting and sharpness correcting unit 220 may calculate the sharpness enhancement degree correction amount and the granularity correction amount in accordance with the presence or the absence of the edge portion (or the flat portion to the contrary) extracted by the image processing method and apparatus of the first and second embodiments of the invention as described above in each unit region 240, more preferably in accordance with the intensity of gradient of each unit region 240 and may thereafter perform granularity correction and sharpness enhancement degree correction on the basis of the thus calculated correction amounts. In this case, when the image data in one frame is divided to form a plurality of unit regions 240, these unit regions 240 may be separated into either the edge portion that is to be extracted by the image processing method and apparatus of the first and second embodiments of the invention and the flat portion, or a plurality of parts in accordance with the intensity of gradients. If a plurality of parts are first formed to the contrary, the intensity of gradient of each unit region 240 may be calculated.

These correction amount can be calculated in accordance with the gradation of each unit region 240 and/or the presence or the absence of the edge portion (intensity of gradient). As an exemplary case, the granularity correction amount of each unit region 240 is preferably calculated on the basis of the density of each of a plurality of the unit regions 240, while the sharpness correction amount is preferably calculated in accordance with the presence or the absence of the edge portion (intensity of gradient) of each unit region 240.

The image data converting subsection 210 of the prescan side converts a plurality of image data of respective unit regions 240 obtained by the image data processing subsection 208 into an image data for display for representing on the monitor 116M based on 3D-LUTs. On the other hand, the image data converting subsection 216 of the main-scan side converts image data processed in the image data processing subsection 214 into an image data for producing a print at the laser printer unit 118 based on 3D-LUTs. The image data for display and the image data for producing the print are different in color system from each other but coincide in various corrections described below with each other.

Namely, the prescan processing section 212 and the main-scan processing section 218 are connected to a condition setting section 224. The condition setting section 224 comprises a setup subsection 226, a key correcting subsection 228 and a parameter coordinating subsection 230.

The setup subsection 226 performs the steps of: setting reading conditions of main-scan employing the prescanned data; supplying them to the line CCD scanner 114; calculating image processing conditions of both prescan processing section 212 and the main-scan processing section 218; and supplying the calculated conditions to the parameter coordinating subsection 230.

The key correcting subsection 228 calculates correction amounts of image processing conditions in accordance with various commands entered by keys and a mouse arranged in a keyboard 116K that adjust densities, colors, contrasts, sharpness, saturation, granularities and the like and thereafter supplies the calculated correction amounts to the parameter coordinating subsection 230.

The parameter coordination subsection 230 sends the image processing conditions received from the aforementioned setup subsection 226 and the key correcting subsection 228 to the image data processing sections 208 and 214 of the prescan side and the main-scan side respectively where the sent image processing conditions are to be corrected or reset.

Figure 16:
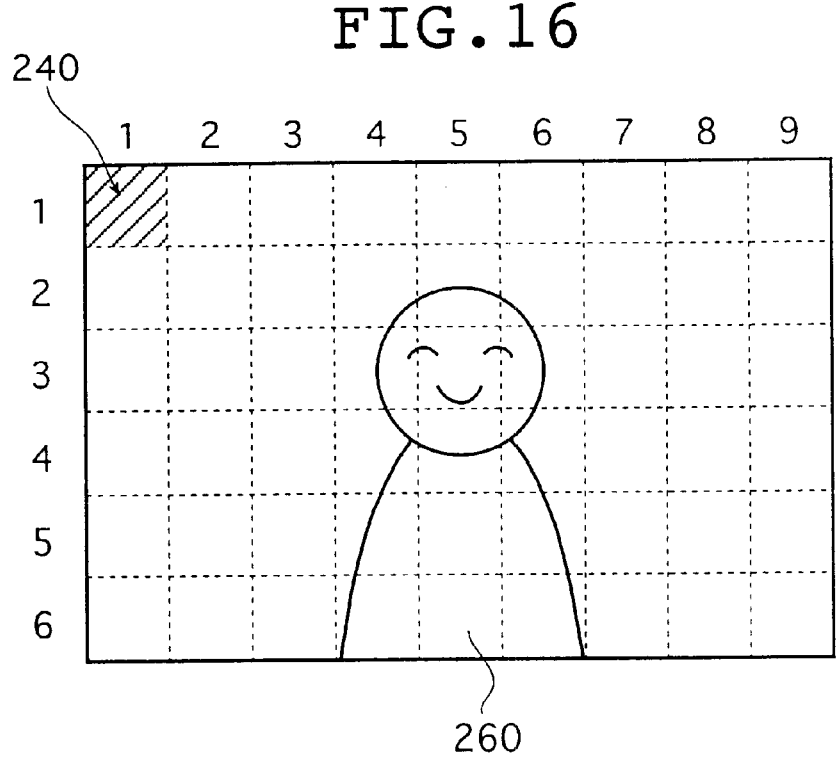
FIG. 16 is an illustration showing a state of an image data in a frame divided into 9×5 unit regions.

Now, as an representative example of the granularity correction processing, processing operations to be performed in the granularity correcting and sharpness correcting unit 220 are described. However, as described above, the granularity correction processing is not limited to the above processing operations. The granularity correcting and sharpness correcting unit 220 performs the steps of: dividing the prescanned data, for example, the image data in one frame, into unit regions 240 in a 9×5 size as shown in FIG. 16; calculating densities of respective unit regions 240; and determining the granularity correction amounts based on the thus calculated densities.

Figure 17:
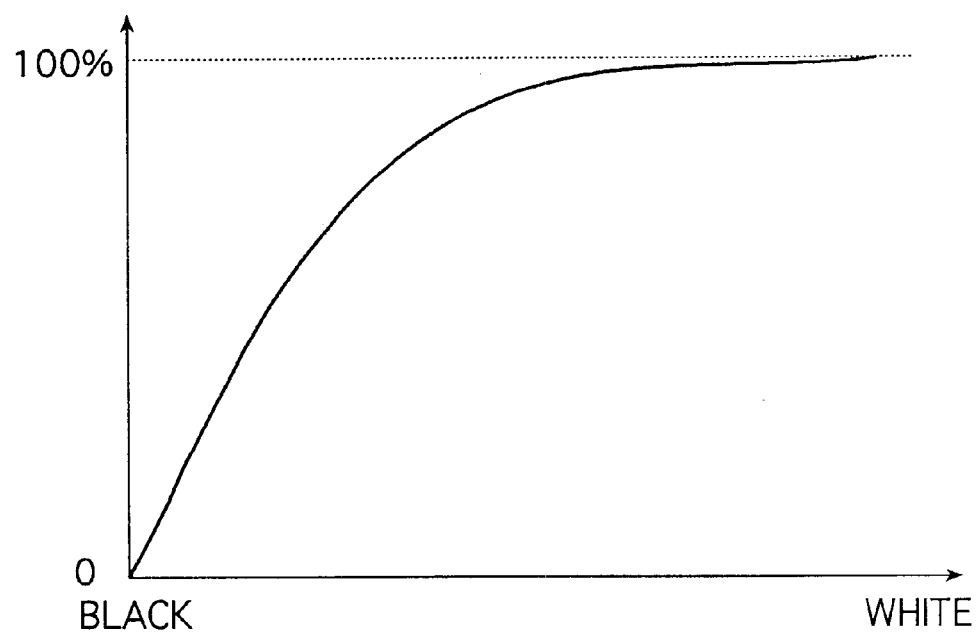
FIG. 17 is a diagram showing an example of correlation between density and color (luminance)

FIG. 17 is a diagram showing a correlation between a color (luminance) and a density. As shown in FIG. 17, the color and the density are not in a proportional relation but in a quadratic curve-like relation with each other. The lower the density becomes, the worse the granularity becomes; hence graininess of the image becomes conspicuous. This shows that the color (luminance) and a correction amount of the granularity are in a relationship as shown in a curve in FIG. 18 where the lower the color (luminance), the greater the granularity correction amount.

Figure 18:
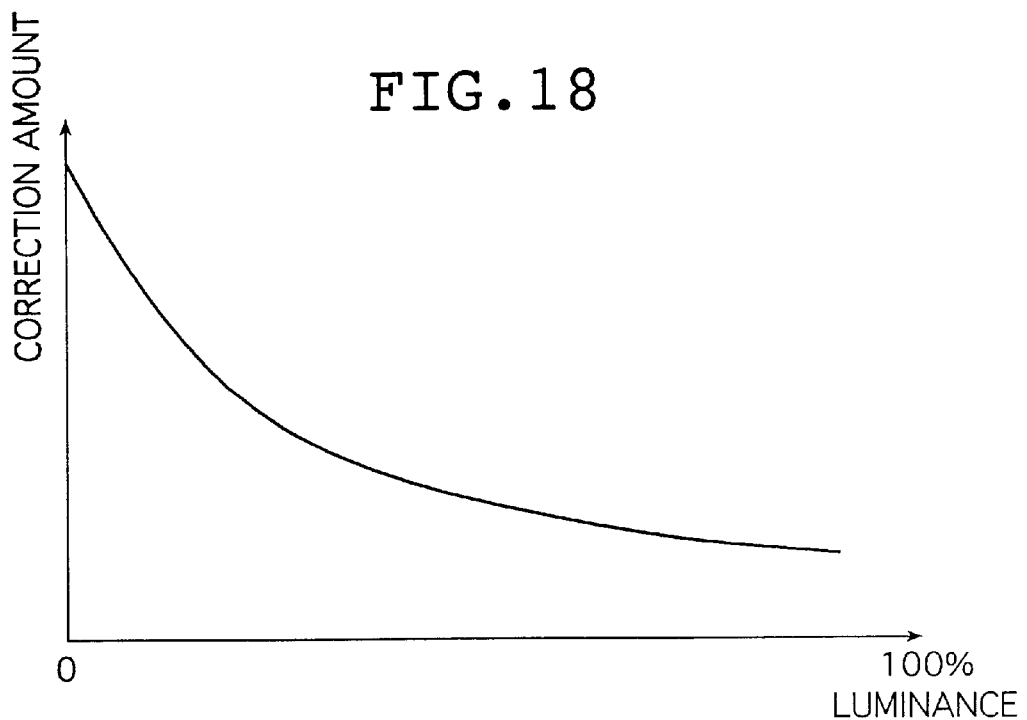
FIG. 18 is a diagram showing an example of correlation between color (luminance) and correction amount of granularity.

The granularity correcting and sharpness correcting unit 220 of an embodiment of the invention calculates an average density of each unit region 240 and thereafter obtains luminance from the calculated average density on the basis of the diagram shown in FIG. 17, thereby calculating the granularity correction amount of each unit region 240 on the basis of the diagram shown in FIG. 18.

In this embodiment, the image data in one frame is divided into 9×5 unit regions. The method of dividing the image data is by no means limited to the 9×5 size and it is capable of appropriately selecting any one of a 6×6 size, a 10×10 size, each pixel and the like according to purposes.

Figure 19:
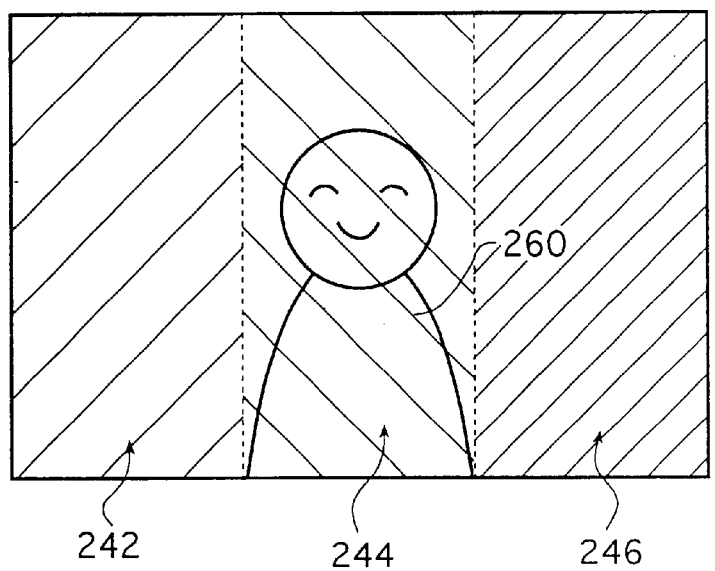
FIG. 19 is an illustration showing a state when the image data in one frame is divided into three regions: a left region, a central region and a right region.
Figure 20:
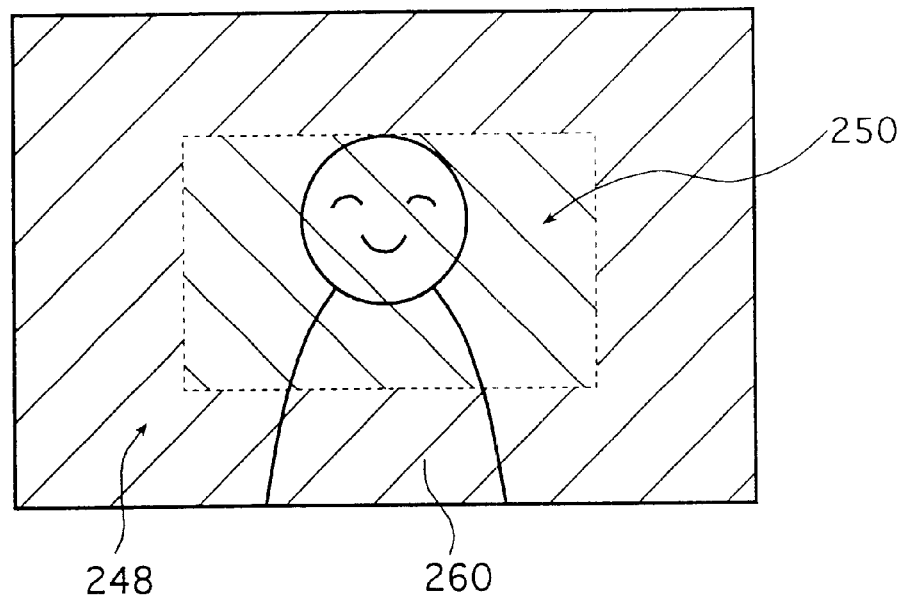
FIG. 20 is an illustration showing a state when the image data in one frame is divided into a central region and the other region.
Figure 21:
FIG. 21 is an illustration showing a state when the image data in one frame is divided into a main subject region and the other region that have been effected by extracting a main subject only from the image data by a main subject extracting means.
Figure 22:
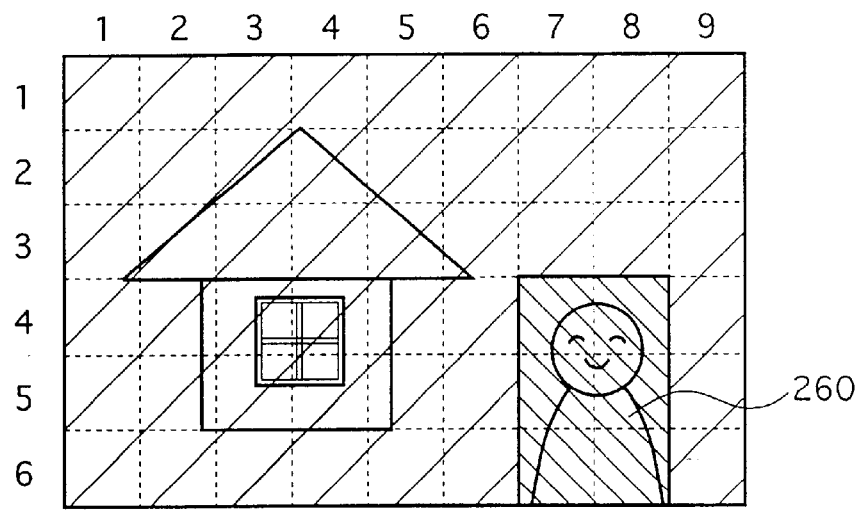
FIG. 22 is an illustration showing a state when the image data in one frame is divided into 9×5 where six regions recorded with the main subject and the other regions than the six regions are separated.

Applicable are following examples: the image in one frame can be divided into three regions, that is, a left side region 242, a central region 244 and a right side region 246 as shown in FIG. 19; it can be divided into another three regions, that is, an upper region, a central region and a lower region, though not shown in figures; it can be divided into a central region 250 and the remaining region 248 as shown in FIG. 20; it can be divided into a main subject region 260 extracted from the image data by a main subject extracting device and the remaining region 262 as shown in FIG. 21; and further it can be divided into 9×5 thereby forming six regions the main subject is recorded (vertical-horizontal numbers; 4–7, 4–8, 5–7, 5–8, 6–7 and 6–8) and the remaining regions as shown in FIG. 22. Of course, even though a plurality of the main subjects exist in the different regions each other, it can be adopted that it is divided into unit regions previously determined or regions previously extracted.

Moreover, an embodiment of the invention comprises the steps of: dividing the image in one frame into 9×5 unit regions 240 regardless of the position of the main subject 260; and calculating the appropriate correction amount of each unit region 240 whereupon the granularity appropriate correction of the image data in one frame as a whole is performed. However, it can otherwise comprise the step of performing the granularity correction of regions where the main subject 260 is recorded accurately while performing the granularity correction of other regions roughly, and it can comprise the step of performing the granularity correction of regions only which the main subject 260 is recorded or the other step. As described above, the granularity correction may be selectively performed by limiting regions to be subjected to correction processing. It of course can otherwise still comprise the step of performing the correction of the image data in one frame as a whole according to the granularity correction amount of the region where the main subject 260 is recorded.

Figure 23:
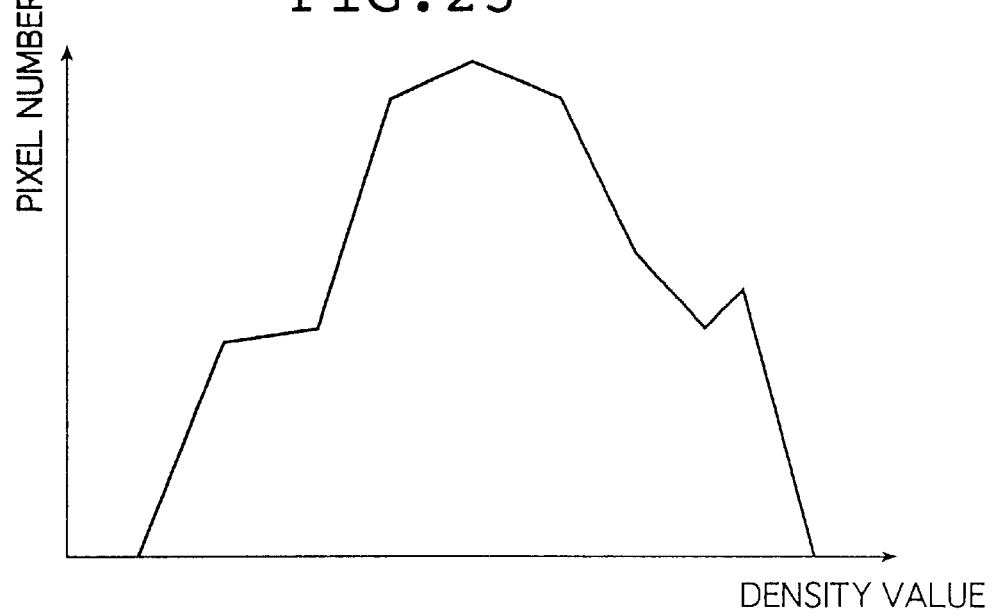
FIG. 23 is a diagram showing an example of density cumulated histogram calculated from the image data in one frame.

Furthermore, since the granularity correction amount is dependent on the density of the main subject, it can in another case comprise the step of determining a density cumulated histogram where the ordinate and the abscissa designate the pixel number and the density amount respectively as shown in FIG. 23 from the image data in one frame; and selecting the pixel or the region within a preset density range from the density cumulated histogram to perform the granularity correction or the step of performing the granularity correction of a part (a region which the main subject is recorded, other regions than the region which the main subject is recorded, a region which a customer required or the like) of or all of the image data in one frame by applying the correction amount corresponding to the pixel or the region with the same density.

The granularity and the degree of the sharpness enhancement are in a tradeoff relation with each other so that the granularity correcting and sharpness correcting unit 220 performs the sharpness enhancement processing and, at the same time, the granularity corrections as described below on the basis of the above-obtained correction amount.

Figure 24:
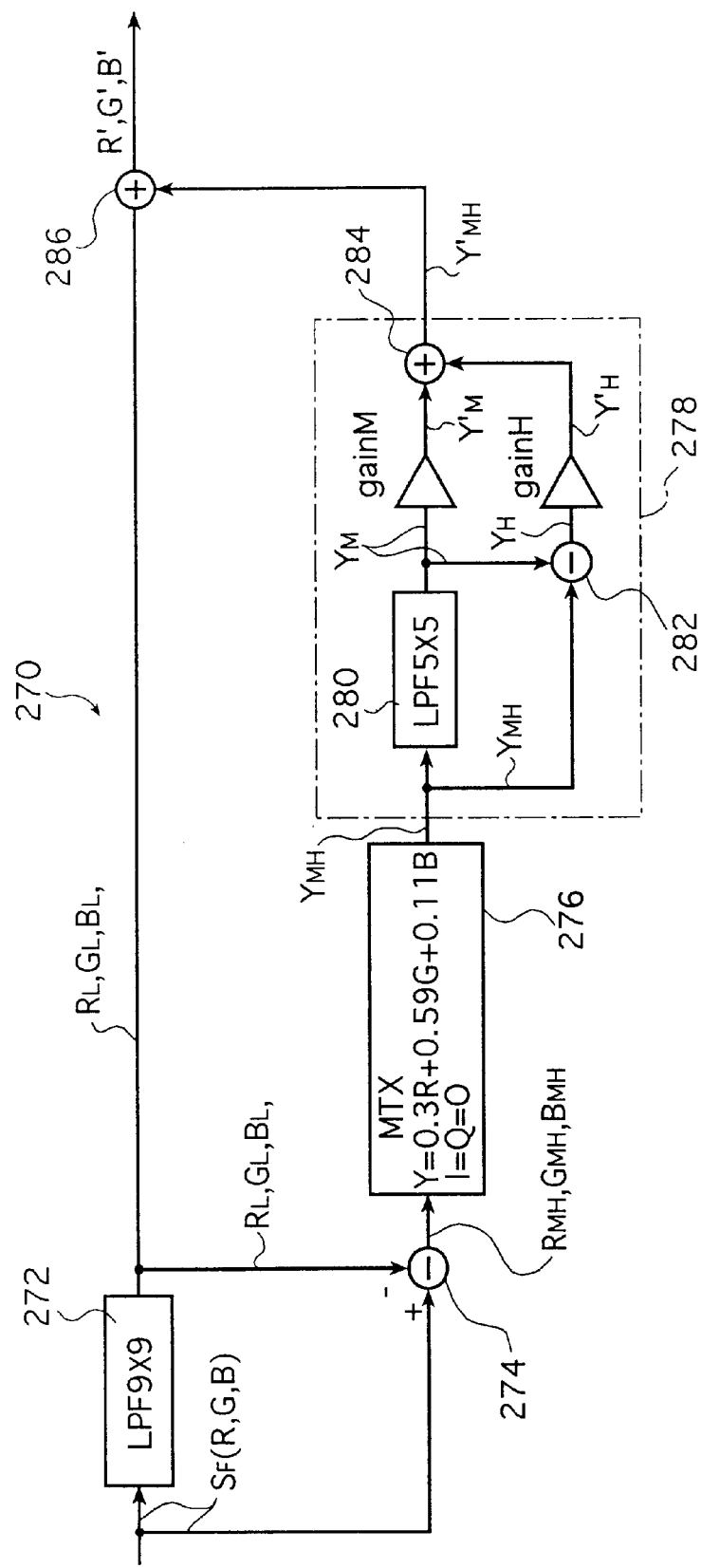
FIG. 24 is a block diagram showing an example of grain suppression and sharpness enhancement processing according to the embodiment of the invention.

As shown in FIG. 24, a processing circuit 270 of the granularity correction and sharpness correcting unit 220 subjects a fine scanned data $S_F$ (R, G and B) to filtering processing by a 9×9 low-pass filter 272 fabricated by connecting 5×5 low-pass filters shown below in 2-step cascade to extract low frequency components $R_L$, $G_L$ and $B_L$.

$$\begin{pmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{pmatrix}$$

Next, the low frequency components $R_L$, $G_L$ and $B_L$ are subtracted from the fine-scanned data $S_F$ by a subtracter 274 to extract middle and high frequency components $R_{MH}$, $G_{MH}$ and $B_{MH}$. The low frequency components $R_L$, $G_L$ and $B_L$ that remain after the above extraction is performed do not include graininess caused by an edge and a fine texture of a color image and grains of a film. On the other hand, middle frequency components $R_M$, $G_M$ and $B_M$ include graininess caused by grains of the film. Moreover, high frequency components $R_H$, $G_H$ and $B_H$ include the edge and the fine-texture of the color image.

Figure 25:
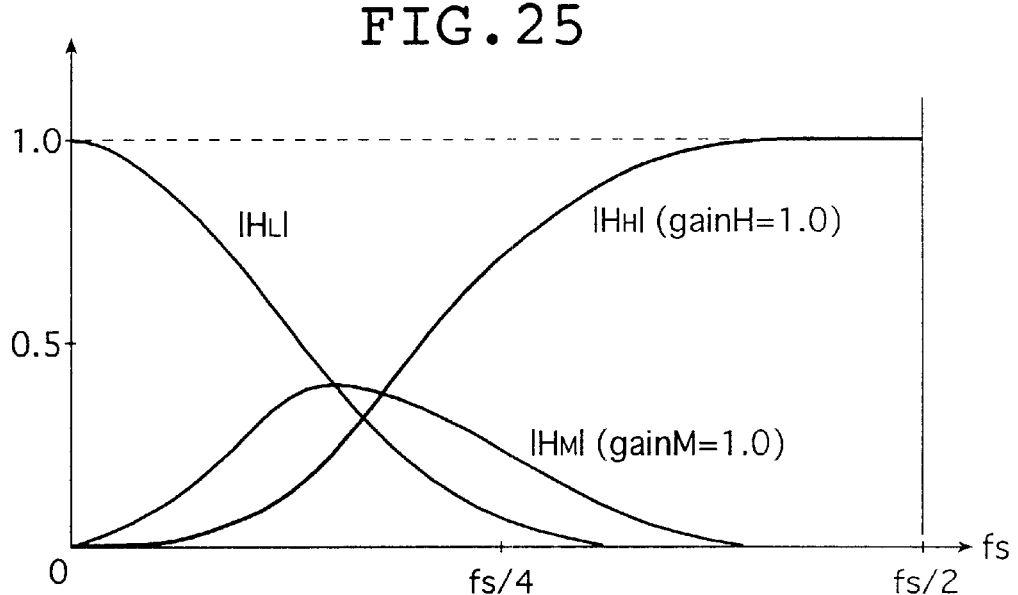
FIG. 25 is a characteristic graph showing distributions of low-, middle- and high-frequency components.

The low frequency components $R_L$, $G_L$ and $B_L$, the middle frequency components $R_M$, $G_M$ and $B_M$ and the high frequency components $R_H$, $G_H$ and $B_H$ of the fine-scanned data are frequency components in the case where gains M and H for multiplying the middle and high frequency components distributed as shown in FIG. 25 are 1.0. The middle frequency components $R_M$, $G_M$ and $B_M$ are such frequency components as have a distribution $H_M$ with a peak in the vicinity of ⅓ of a Nyquist frequency fs/2 of the output of the processed data when the processed data is reproduced as a visible image. The low frequency components $R_L$, $G_L$ and $B_L$ are components that have a distribution $H_L$ with a peak at 0 frequency. The high frequency components $R_H$, $G_H$ and $B_H$ are components that have a distribution $H_H$ with a peak at the Nyquist frequency fs/2 of the output.

The Nyquist frequency in an embodiment of the invention is called as such when recording on a light sensitive material is performed in 300 dpi. In FIG. 18, the sum of the frequency components at each frequency is 1.

Next, luminance components are extracted from the separated middle and high frequency components $R_{MH}$, $G_{MH}$ and $B_{MH}$ by a matrix 276. The extraction of the luminance components is performed whereupon the middle and high frequency components $R_{MH}$, $G_{MH}$ and $B_{MH}$ of the fine-scanned data are converted to a YIQ base the component $Y_{MH}$ of which shows the luminance component of the data.

The conversion to the YIQ base is performed by the following equation:

$$\begin{pmatrix} I \\ Q \\ Y \end{pmatrix} = \begin{pmatrix} 0.06 & -0.28 & -0.32 \\ 0.21 & -0.52 & 0.31 \\ 0.30 & 0.59 & 0.11 \end{pmatrix} \begin{pmatrix} R \\ G \\ B \end{pmatrix}$$

Color components, that is, component $I_{MH}$ and component $Q_{MH}$, of the thus converted YIQ base include graininess of colors caused by film grains whereupon the above graininess of colors can be suppressed by bringing the component $I_{MH}$ and component $Q_{MH}$ to 0.

It is known from experiences that the color components, that is, the component $I_{MH}$ and component $Q_{MH}$, are scarcely included in the image recorded with an ordinary subject. Therefore, a good reproduced image with suppressed graininess can be obtained by bringing the component $I_{MH}$ and the component $Q_{MH}$ that are regarded as graininess caused by the film grains to 0.

The component $Y_{MH}$ are then subjected to filtering process by the aforementioned 5×5 low-pass filters 280 in a gain processing section 278 to obtain a middle frequency component $Y_M$ of the component $Y_{MH}$. In a succeeding step, the obtained middle frequency component $Y_M$ is subtracted by the subtracter 282 from the component $Y_{MH}$, thereby getting a high frequency component $Y_H$ of the component $Y_{MH}$.

Subsequently, the gains M and H that have been obtained in the aforementioned granularity correcting and sharpness correcting unit 220 are multiplied by components $Y_M$ and $Y_H$ respectively as shown in the following equation to obtain the processed components $Y_M'$ and $Y_H'$. These components $Y_M'$ and $Y_H'$ are then combined with each other by an adder 284 to produce a component $Y_{MH}'$.

$$Y_{MH}' = \text{gain } M \times Y_M + \text{gain } H \times Y_H$$

$$(Y_M' = \text{gain } M \times Y_M, Y_H' = \text{gain } H \times Y_H)$$

The gains M and H are set in the granularity correcting and sharpness correcting unit 220 in a way that the gain M is smaller than the gain H (gain M<gain H). Namely, the graininess based on the film grains is included in the middle frequency component to a relatively great extent so that the graininess can be suppressed by setting the gain M of the component $Y_M$ in a relatively low amount. The degree of the sharpness of the image depends on high frequency component of the luminance component so that the degree of sharpness of the processed image can be enhanced by bringing the gain H of the high frequency component of the luminance component to a relatively high amount.

Take, for example, a case where the color image is in an under-exposed condition on the negative film. In this case, graininess caused by the film grains is conspicuous and, moreover, if gradation is raised (hardened) aiming for improving the gradation characteristics, the image will have fairly bad graininess, whereas the graininess can be greatly suppressed by setting relatively low the gain M that is calculated on the basis of each unit region.

Namely, the granularity correcting and sharpness correcting unit 220 calculates the optimal gain M of each of the unit regions produced by the aforementioned dividing method as a correction amount to suppress the granularity on the basis of the calculated gain M. This gain M can be set in accordance with an area of a divided image data, or otherwise the gain M and the gain H that each comply with a customer's preference are stored as tables and thereafter those that comply with the customer's requirement can be appropriately selected from among them on the basis of each unit region 240.

Then, the thus obtained component $Y_{MH}$ is combined by the adder 286 with the low frequency components $R_L$, $G_L$ and $B_L$ of the aforementioned fine-scanned data $S_F$, thereby obtaining the processed signals R', G' and B'. If the aforementioned component $I_{MH}'$ is reversely converted and adapted to R, G and B data, all three data of R, G and B will all have the same value as the component $Y_{MH}$ has. Accordingly, the processed luminance component $Y_{MH}'$ is combined without reversely converting, thereby performing processing operations easier.

Then, each unit region 240 is subjected to the aforementioned processing to produce a plurality of the processed signals R', G' and B' on the basis of each unit region 240 for being outputted to the image data converting subsection 210.

In the above example, granularity correcting and sharpness correcting unit 220 calculates granularity correction amount of each unit region on the basis of the density of each of a plurality of unit regions formed by dividing the data in one frame, thereby correcting the granularity of the image data on the basis of the calculated correction amount of each unit region. The invention is by no means limited to the above operations.

Alternatively, as described above, on the basis of the presence or the absence of the edge portion extracted by the image processing method and apparatus of the first and second embodiments of the invention in a plurality of unit regions, the edge intensity of the extracted edge portion (intensity of gradient) or the intensities of gradients of a plurality of unit regions, the degree of the sharpness enhancement of each unit region is calculated whereupon the sharpness enhancement degree correction of the image data may be performed on the basis of the calculated correction amount. In this case, the correction of the degree of the sharpness enhancement of each unit region may adjust (increase or decrease) its correction amount, namely, the gain H of the high frequency component $Y_H$ of the luminance component at the gain processing section 278 of the processing circuit 270 in accordance with the presence or the absence of the edge portion in each unit region, may adjust its correction amount in proportional to the edge intensity (intensity of gradient) (the edge intensity of the unit region which includes only flat portion and does not include any edge portion being 0) of the edge portion included in each unit region or may first calculate the intensity of gradient of each specified region by the above-mentioned method and may then adjust its correction amount in accordance with the thus calculated intensity of gradient.

Moreover, in the invention, the granularity correction based on the density of each unit region and/or sharpness enhancement degree correction based on the presence or the absence of the edge portion in each unit region (or edge intensity or gradient intensity) may be performed. Optionally, the sharpness enhancement degree correction may be performed on the basis of the density of each unit region or may be performed based on the combination of the above basis and the presence or the absence of the edge portion in each unit region (or edge intensity or gradient intensity). Moreover, the granularity correction may be performed on the basis of the presence or the absence of the edge portion in each unit region (or edge intensity or gradient intensity) or may be performed based on the combination of the above basis and the gradation of each unit region.

Furthermore, the edge portion extraction is not limited to the image processing method and apparatus of the invention and it can employ known detecting methods such as a local distribution method, linear differentiation, quadratic differentiation, zero crossing, analytical processing and the like.

As described above, according to the third, fourth and fifth embodiments of the present invention, the granularity correction of the data in one frame is performed on the partial image data basis whereupon effects of the invention can be achieved in a manner that the image processing method and apparatus that can perform corrections in a careful and minute manner in accordance with the difference of the granularity or the difference of the edge portion from the flat portion (grainy portion) in the image recorded within one frame can be obtained.

While the image processing method and apparatus of the present invention has been described above in detail, it should be noted that the invention is by no means limited to the foregoing embodiments and various improvements and modifications may of course be made without departing from the scope and spirit of the invention.

What is claimed is:

1. An image processing apparatus for photoelectrically reading an image recorded on a film or a subject so as to obtain mage data which is subjected to specified image processing to produce output image data, comprising:

granularity correction amount calculating means for calculating a correction amount of a granularity in each of a plurality of specified regions base on the density of a each of the plurality of specified regions, said plurality of specified regions being formed by dividing said image data; and granularity correction means for correcting the granularity of said image data based on the correction amount of each specified region calculated by said granularity correction amount calculating means.

2. The image processing apparatus according to claim 1, wherein said granularity correction means corrects said image data as a whole by selecting an optimal value from among correction amounts calculated on respective specified regions.

3. The image processing apparatus according to claim 1, wherein said granularity correction means corrects image data in each specified region based on the correction amount corresponding to the respective specified region.

4. The image processing apparatus according to claim 1, wherein said granularity correction means corrects only the image data in a specified region placed at a predetermined position based on the correction amount calculated from the specified region at the predetermined position.

5. The image processing apparatus according to claim 1, wherein said specified region is a region composed of one pixel.

6. The image processing apparatus according to claim 1, further comprising main subject extraction means for extracting an occupied region of a main subject from said image data, wherein, as said specified region, said occupied region extracted by said main subject extraction means or the other region than said occupied region is selected.

7. The image processing apparatus according of claim 1, wherein said specified region is a set of pixels having specified density obtained from a density cumulated histogram of said image data.

8. The image processing apparatus according to claim 1, wherein said density is a relative density difference from a base density of a film applied.

9. The image processing apparatus according to claim 1, further comprising film kind distinguishing means for distinguishing a film kind, wherein said granularity correction amount calculating means adjusts a reference value for calculating the correction amount in accordance with the film kind provided from said film kind distinguishing means.

10. The image processing apparatus according to claim 1, further comprising: sharpness enhancement degree correction amount calculating means for calculating the correction amount of a degree of sharpness enhancement in each specified region based on whether the plurality of specified regions formed by dividing said image data include an edge portion or not; and sharpness enhancement degree correction means for correcting the degree of the sharpness enhancement of said image data based on the correction amount of each specified region calculated by said sharpness enhancement degree correction amount calculating means.

11. The image processing apparatus according to claim 1, wherein said granularity correction amount calculating means further calculates the correction amount of the granularity in each specified region based on whether the plurality of the specified regions formed by dividing said image data include an edge portion or not.

12. The image processing apparatus for photoelectrically reading an image recorded on a film or a subject so as to obtain image data which is subjected to specified image processing to produce output image data, comprising:

sharpness enhancement degree correction amount calculating means for calculating a correction amount of a degree of sharpness enhancement in each of a plurality of specified regions based on whether the plurality of specified regions include an edge portion or not, said plurality of specified regions being formed by dividing said image data; and sharpness enhancement degree correction means for correcting said degree of the sharpness enhancement of said image data based on the correction amount of each specified region calculated by said sharpness enhancement degre correction amount calculating means.

13. An image processing method for photoelectrically reading an image recorded on a film or a subject so as to obtain mage data which is subjected to specified image processing to produce output image data, comprising the step of:

calculating at least one of a correction amount of a granularity in each of a plurality of specified regions based on the density of each the plurality of the specified regions, said plurality of specified regions being formed by dividing said image data, and a correction amount of a degree of a sharpness enhancement in each of the plurality of specified regions based on whether the plurality of the specified regions formed by-dividing said image data include an edge portion or not, wherein the granularity or the degree of the sharpness enhancement of said image data is corrected based on the calculated correction amount of each of the plurality of specified regions.

14. The image processing apparatus according to claim 13, wherein said correction amount of the granularity in each of said specified regions is further calculated based on whether the plurality of the specified regions include the edge portion or not.

* * * * *

UNITED STATES PATENT AND TRADEMARK OFFICE
CERTIFICATE OF CORRECTION

PATENT NO.   : 6,697,537 B2
DATED        : February 24, 2004
INVENTOR(S)  : Norimatsu It is certified that error appears in the above-identified patent and that said Letters Patent is hereby corrected as shown below:

Column 34,
Line 24, change "mage data" to -- image data --.
Line 28, change "base" to -- based --.
Line 59, change "according of" to -- according to --.

Column 36,
Line 5, change "degre" to -- degree --.
Line 9, change "mage data" to -- image data --.
Line 14, change "each the plurality" to -- each of the plurality --.
Line 21, change "by-dividing" to -- by dividing --.

Signed and Sealed this

Thirteenth Day of July, 2004

JON W. DUDAS
*Acting Director of the United States Patent and Trademark Office*